United States Patent
Hirano et al.

(10) Patent No.: US 6,646,083 B2
(45) Date of Patent: Nov. 11, 2003

(54) CROSSLINKED POLYMERS CONTAINING TERTIARY AMINE AND/OR QUATERNARY AMMONIUM SALT STRUCTURES, PROCESSES FOR MAKING AND USES THEREOF

(75) Inventors: Yoshiaki Hirano, Nishinomiya (JP); Takehiko Morita, Ibaraki (JP); Takafumi Kubo, Suita (JP); Hiroshi Yamamoto, Kobe (JP); Kenichi Takematsu, Yokohama (JP); Yutaka Sugiyama, Yokohama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 20 days.

(21) Appl. No.: 09/880,876

(22) Filed: Jun. 15, 2001

(65) Prior Publication Data

US 2002/0028887 A1 Mar. 7, 2002

(30) Foreign Application Priority Data

Jun. 16, 2000 (JP) .......................... 2000-181265
Jul. 26, 2000 (JP) .......................... 2000-231370

(51) Int. Cl.⁷ .......................... C08F 26/06; B01J 13/14; C07C 69/54; C07C 67/26; C07C 31/20; C07C 29/10
(52) U.S. Cl. .................... 526/263; 526/295; 525/327.1; 524/269; 524/548; 560/209; 568/867
(58) Field of Search ................. 526/263, 295; 525/327.1; 524/269, 548; 560/209; 568/867

(56) References Cited

U.S. PATENT DOCUMENTS

| | | | |
|---|---|---|---|
| 3,716,481 A | 2/1973 | Battaerd | 210/32 |
| 3,891,576 A | 6/1975 | Battaerd et al. | 260/2.1 R |
| 3,941,724 A | 3/1976 | Bolto | 260/2.1 R |
| 4,863,646 A | 9/1989 | Watanabe et al. | |

FOREIGN PATENT DOCUMENTS

| | | |
|---|---|---|
| DE | 3508439 A1 | 9/1985 |
| EP | 0 841 350 A1 | 5/1998 |
| EP | 0 866 088 A1 | 9/1998 |
| EP | 0 970 937 A1 | 1/2000 |
| EP | 1 022 058 A1 | 7/2000 |
| GB | 852306 | 10/1960 |
| GB | 2277915 A | 11/1994 |
| JP | 49-31631 | 8/1974 |
| JP | 2-41528 | 9/1990 |
| JP | 4-311710 | 11/1992 |
| JP | 9-508136 | 8/1997 |
| JP | 11-12206 | 1/1999 |
| JP | 3130642 | 11/2000 |
| WO | WO 85/04393 | 10/1985 |
| WO | WO 97/19043 | 5/1997 |

Primary Examiner—D. R. Wilson
(74) Attorney, Agent, or Firm—Connolly Bove Lodge & Hutz LLP

(57) ABSTRACT

Crosslinked polymers excellent in ion exchange capacity and catalytic activity and in resistance to thermal decomposition and widely applicable in various fields of use; a crosslinking agent which is suited for use as a raw material in the production of crosslinked polymers; a method of producing crosslinked polymers; a method of producing a spherical particle which is suited for use in the production of crosslinked polymers; a method of producing a hydroxy alkyl (meth)acrylate; and a method of producing glycols using the crosslinked polymers are provided. The crosslinked polymer has at least one crosslink structure and a tertiary amine structure and/or a quaternary ammonium salt structure, wherein at least one crosslink structure is represented by the following general formula (1):

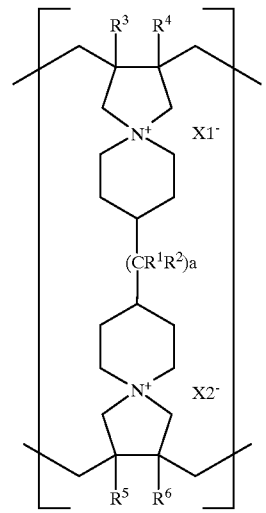

(1)

7 Claims, 3 Drawing Sheets

CROSSLINKED POLYMERS CONTAINING TERTIARY AMINE AND/OR QUATERNARY AMMONIUM SALT STRUCTURES, PROCESSES FOR MAKING AND USES THEREOF

TECHNICAL FIELD

The present invention relates to a crosslinked polymer as well as a method of producing the same and a method of using the same. More particularly, it relates to a crosslinked polymer suited for use as an ion exchange resin or a polymer catalyst, a crosslinking agent suited for use in producing crosslinked polymers, a method of producing crosslinked polymers, a method of producing a spherical particle suited for use in producing crosslinked polymers, a method of using crosslinked polymers, a method of producing a hydroxy alkyl (meth)acrylate and a method of producing glycols using crosslinked polymers.

BACKGROUND ART

Crosslinked polymers having strong basicity or like properties can show ion exchange activity and/or catalytic activity in various reactions and therefore are used widely as ion exchange resins or polymer catalysts in various fields of industry, for example in pure water production, amino acid separation and purification, catalyst recovery, metal recovery, iodine recovery, sugar solution recovery, sucrose decolorization, uranium purification, and formalin purification. Strongly basic styrenic ion exchange resins, which are copolymers of styrene and divinylbenzene, for instance, are generally known as such crosslinked polymers.

Such strongly basic styrenic ion exchange resins are generally produced by suspension polymerizing styrene and divinylbenzene to thereby synthesize a crosslinked polystyrene-divinylbenzene, which is a crosslinking product derived from a styrene-divinylbenzene copolymer, in a spherical form, then chloromethylating this crosslinked polymer using a Lewis acid, for instance, and causing a tertiary amine or the like to add thereto to thereby introduce an amine structure thereinto. Such strongly basic ion exchange resins can be involved in ion exchange reactions in the whole pH range and therefore are utilized in a wide range of applications.

In such strongly basic ion exchange resins, the nitrogen atom in the amine structure resulting from introduction of a tertiary amine or the like into the crosslinked polymer, namely the nitrogen atom in the tertiary amine-derived quaternary ammonium salt (OH form), is the main site contributing to the ion exchange capacity or catalytic activity. For strongly basic crosslinked polymers, it is therefore very important that such sites, namely the so-called active sites, are retained stably so that the function thereof can be performed continuously with good durability. However, when strongly basic styrenic ion exchange resins are used at an elevated temperature not lower than 40° C., a problem is encountered, namely insufficient resistance to thermal degradation as a result of elimination or decomposition of the amine structure due to ready thermal decomposability of the quaternary ammonium salt from the chemical structure viewpoint, which leads to a reduction in performance.

To cope with such a problem, it is a current practice to render the amine structure less eliminable by selecting a chloromethylating agent as a spacer or increase the molecular weight of the resin to thereby increase the introduction of the amine structure in excess of a certain level. Essentially, however, these measures cannot render the quaternary ammonium salt resistant to thermal decomposition, hence cannot improve the resistance of strongly basic ion exchange resins to thermal decomposition to a satisfactory extent. Therefore, the advent of a technology has been awaited by which the active sites contributing to the ion exchange capacity or catalytic activity can be essentially rendered resistant to thermal decomposition and by which crosslinked polymers widely usable in various applications as strongly basic ion exchange resins, for instance, and a method of producing the same can be developed and established.

Meanwhile, if a crosslinked polymer is obtained in the form of spherical particles, that form will provide an increased surface area and improve the handling qualities of the polymer and, thus, it becomes possible to use the same widely in various industrial products. As examples of the products which utilize a crosslinked polymer in the form of spherical particles, there may be mentioned ion exchange resins, water absorbing resins and catalysts, among others. Not only such organic spherical particles but also inorganic spherical particles such as spherical silica gel particles are of commercial importance, and methods of producing such spherical particles have also been the targets of investigation.

A simple and easy method of producing a spherical particle comprises, for example, dispersing in a medium or formation of a dispersed product by polymer formation in a medium, and this method is suited for the formation of spherical particles uniform in shape and size, hence is widely employed on commercial scales. However, when the spherical particles formed as a dispersed product tend to coagulate or stick together, there arises a problem: they give agglomerate bodies, hence no uniform products can be obtained. Therefore, in producing spherical particles in a medium, the spherical particles formed are prevented from giving agglomerate bodies by using a suspending agent or carrying out vigorous stirring. In some cases, however, such means fail to give sufficiently uniform spherical particles or cannot be applied to the production of high quality commercial products since the use of a suspending agent or vigorous stirring is required. Further, there is still room for improvement from the production cost viewpoint.

Japanese Kokai Publication Hei-04-311710 discloses a method of preparing homopolymers or copolymers by preparing a two-phase system containing droplets of an aqueous solution of at least one water-soluble monomer such as a diallyldialkylammonium chloride and carrying out the polymerization in the presence of a combination of a precipitation inhibitor and an emulsifier. This method of preparation was thought to give spherical particles uniform to some extent with a slight particle size distribution. However, the combined use of a precipitation inhibitor and an emulsifier for preventing spherical particles from becoming agglomerate bodies cannot be applied to the production of high quality commercial products in some cases and, in view of the use of these additives, there is room for improvement from the production cost viewpoint.

Japanese Kokoku Publication Hei-02-41528 discloses a method of producing spherical ion exchange resins which comprises using a copolymer having a hydrophilic group and a hydrophobic group as a dispersing agent in producing copolymers following suspending an aqueous solution containing a diallyldialkylammonium chloride and a compound having at least two diallylammonium groups in each molecule or a compound having at least two para-(or meta-) vinylphenylmethylammonium groups or their mixture in each molecule in a water-insoluble organic solvent. This production method, too, was considered to be able to give spherical particles uniform to some extent. However, this production method, too, uses such a copolymer as a dispersing agent and, therefore, cannot be applied to the production of high quality commercial products in certain cases and there is also room for improvement from the production cost viewpoint.

As mentioned above, investigations have been made to develop crosslinked polymers and establish a method of producing the same. If such crosslinked polymers can be used as a catalyst with commercial advantage, then it will become possible to produce various chemical products efficiently and expediently. Accordingly, investigations are being made concerning how to use such crosslinked polymers.

For instance, glycols can be produced commercially by reacting an oxirane compound with water and, in the production of monoethylene glycol, which is industrially of particular importance as a glycol, monoethylene glycol is selectively produced as the main product by using a large amount of water to thereby prevent the formation of byproducts, such as diethylene glycol and triethylene glycol. However, such a production method requires a step of removing the excessive amount of water used in the reaction step by consuming a lot of energy, hence is unfavorable from the industrial viewpoint. Accordingly, methods have been explored to produce monoethylene glycol selectively by carrying out the reaction in the presence of a catalyst and thereby reducing the amount of water to be used.

Japanese Kokai Publication Hei-05-47528 discloses a method of producing alkylene glycols which comprises reacting an alkylene oxide with water in a heterogeneous system involving a metalate-containing solid. In this production method, the metalate-containing solid has a structure such that a styrene-divinylbenzene copolymer or the like serves as a solid support and a metalate anion is associated with electropositive complexing sites of the support. However, since it has a structure such that metalate anion-associated electropositive complexing sites are bonded to the solid support via a single bond, this metalate-containing solid is susceptible to thermal decomposition from the chemical structure viewpoint and, owing to this, elimination or decomposition tends to occur. Thus, there is room for contrivance for improving the production economy by improving the heat resistance and stably maintaining the catalytic activity. Since, when the electropositive complexing sites with which the metalate anion is associated are thermally decomposed, the product causes discoloration, there is room for contrivance for producing colorless and high-quality product alkylene glycols which are required, when used as raw materials for polyesters such as polyethylene terephthalate, to give transparency and like qualities to polyethylene terephthalate and the like.

Japanese Kohyo Publication Hei-09-508136 discloses a method of producing alkylene glycols in the presence of a catalyst composition comprising a solid material having one or more electropositive sites with one or more anions other than metalate or halogen anions being bonded thereto by coordination. Allegedly, quaternary ammonium salt type anion exchange resins are preferred as the solid material and the bicarbonate is preferred as the anion. However, this solid material still has a structure such that the quaternary ammonium group with the bicarbonate as the anion is bonded to the matrix of the solid material by a single bond and, thus, no contrivance has been made to improve the heat resistance of the quaternary ammonium group. Therefore, there is room for contrivance for producing glycols while improving the heat resistance of the catalyst.

Japanese Kokai Publication Hei-11-12206 discloses a method of producing alkylene glycols which uses, as a catalyst, an anion exchange resin having a structure such that a polymer of a vinyl aromatic compound serves as a base material with a quaternary ammonium group bonded to the aromatic groups of the polymer via a connecting group having a chain length of 3 or more atoms. In this production method, the heat resistance of the quaternary ammonium group manifesting catalytic activity is improved by the connecting group although the anion exchange resin is basically a styrene-divinylbenzene copolymer or the like. However, when an alkylene glycol is produced at elevated temperatures for improving the productivity, the product is discolored. Hence, there is room for contrivance to obtain uncolored, high-quality products.

Japanese Kohyo Publication 2000-500478 discloses a method of producing alkylene glycols in the presence of a catalyst containing a polymeric organosiloxane ammonium salt having a silica-like skeleton. In accordance with this production method, the structure of the polymeric organosiloxane ammonium salt contains cationized nitrogen-containing units with an anion ionically bonded thereto and the those units hardly undergo thermal decomposition owing to their chemical structure; therefore, it is possible to increase the production economy and obtain the products in a colorless, high quality state. However, in a preferred embodiment of this polymeric organosiloxane ammonium salt, cationized nitrogen atoms, which are to serve as active sites of the catalyst, are bonded to the silica-like skeleton via three or four bonds, so that the proportion of the active sites in the polymer is low. In this case, when the reaction temperature is lowered for improving the selectivity toward monoalkylene glycols, the productivity cannot be secured. Thus, there is room for contrivance for increasing the proportion of active sites in the polymer to thereby realize sufficient manifestation of the catalytic activity.

SUMMARY OF THE INVENTION

It is an object of the present invention, which has been made in view of the above-mentioned state of the art, to provide a crosslinked polymer excellent in ion exchange capacity and catalytic activity and in resistance to thermal decomposition and widely applicable in various fields of use. Another object is to provide a crosslinking agent which can be used in various applications and is suited for use as a raw material in the production of crosslinked polymers. A further object is to provide a method of producing crosslinked polymers. A still further object is to provide a method of producing a spherical particle by which uniform, high-quality spherical particles can be produced expediently at low cost and in high yields and which is suited for use in the production of crosslinked polymers. A further object is to provide a method of producing chemical products efficiently and expediently by using a crosslinked polymer, namely a method of using the crosslinked polymer. A still further object is to provide a method of producing glycols by which, in producing glycols using a crosslinked polymer, the catalytic activity can be stably maintained and uncolored, high-quality glycols can be produced with good productivity owing to the excellent heat resistance of the crosslinked polymer and by which monoglycols can be produced while the selectivity and productivity are balanced at high levels.

As a result of various investigations concerning crosslinked polymers, the present inventors found that crosslinked polymers having at least one crosslink structure and a tertiary amine structure and/or a quaternary ammonium salt structure and having a specific crosslinked structure are excellent in ion exchange capacity and catalytic activity and in resistance to thermal decomposition and can be used widely in various application and, at the same time, found out a crosslinking agent suited for use in the production of crosslinked polymers as well as a method suited for the production of crosslinked polymer. Further, as a result of various investigations made to establish a method of producing a spherical particle which is suited for used in the production of crosslinked polymers, they found out a method of producing a spherical particle by which uniform, high-quality products can be obtained expediently at low cost and in high yields while preventing the spherical particles formed from becoming agglomerate bodies and which therefore can favorably be applied to the production of industrial products, inclusive of ion exchange resins, water-absorbing resins and like organic spherical particles as well as silica gels and like inorganic spherical particles. Furthermore, as a result of various investigations made to establish a method of using crosslinked polymers industrially, they found that the crosslinked polymers mentioned above can appropriately be used in various reaction steps. They paid their attention to the fact that when a specific crosslinked polymer is used in producing glycols, the active sites thereof hardly undergo thermal decomposition owing to their chemical structure and are thereby prevented from being eliminated or decomposed, so that the catalytic activity is maintained stably and the production economy is improved and thus it becomes possible to produce uncolored, high-quality glycols as in the case where no catalyst is used and the fact that when the reaction is carried out at elevated temperatures, high levels of reactivity can be expected and such glycols can be produced with good productivity, they further found that since such crosslinked polymer is excellent in catalytic activity, the selectivity toward monoglycols, such as monoethylene glycol, can be improved with reductions in the yields of extra byproducts (di- and triglycol) while maintaining the productivity of the conventional catalyst-free system (total production of mono-, di- and triglycol) and/or the productivity can be improved (reduction in the amount of steam in the step of purification) by reducing the consumption of water and increasing the oxirane compound concentration while maintaining the selectivity (ratio among mono, di- and triglycol), with the result that the selectivity and productivity of monoglycols can be balanced at high levels. These findings have now led to completion of the present invention.

Thus, in a first aspect, the present invention is related to a crosslinked polymer having at least one crosslink structure and a tertiary amine structure and/or a quaternary ammonium salt structure wherein at least one crosslink structure is represented by the following general formula (1):

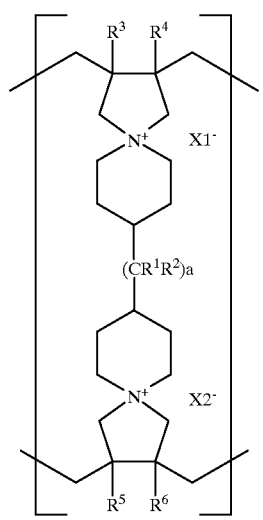

(1)

wherein $R^1$ and $R^2$ are the same or different and each represents a hydrogen or halogen atom or a $C_{1-10}$, alkyl or hydroxyl group; $R^3$, $R^4$, $R^5$ and $R^6$ are the same or different and each represents a hydrogen or halogen atom or a methyl or ethyl group; $X1^-$ and $X2^-$ are the same or different and each represents a halide ion, a hydroxide ion or an organic or inorganic acid anion and a represents an integer of 0 to 10.

In a second aspect, the present invention is related to a crosslinked polymer having at least one crosslink structure and a tertiary amine structure and/or a quaternary ammonium salt structure wherein at least one crosslink structure is represented by the following general formula (2):

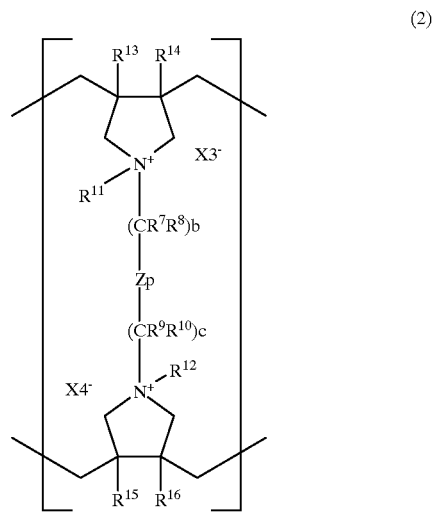

(2)

wherein $R^7$, $R^8$, $R^9$ and $R^{10}$ are the same or different and each represents a hydrogen or halogen atom or a $C_{1-10}$ alkyl or hydroxyl group; $R^{11}$ and $R^{12}$ are the same or different and each represents a $C_{1-10}$ alkyl group; $R^{13}$, $R^{14}$, $R^{15}$ and $R^{16}$ are the same or different and each represents a hydrogen or halogen atom or a methyl or ethyl group; $X3^-$ and $X4^-$ are the same or different and each represents a halide ion, a hydroxide ion or an organic or inorganic acid anion, b and c are the same or different and each represents an integer of 0 to 10; and p represents 0 or 1 provided that the relation b+c+p≧1 should be satisfied; Z represents an —NH—, —N(CH₃)—, —NH—(CH₂)₃—NH—, —NH—(CH₂)₄—NH—, —O—, —CH(OH)—, —O—CH₂—C(CH₃)₂—CH₂—O—, —O—(CH₂)₂—(O—CH₂—CH₂)ₙ—O—, 1,4-piperazinylene, 3-methyl-2,6-pyridyl, 4-methyl-2,6-pyridyl, 2,6-pyridyl or 2,5-pyridyl group and n represents an integer of not less than 0.

In a third aspect, the present invention is related to a crosslinking agent having a structure represented by the following general formula (3):

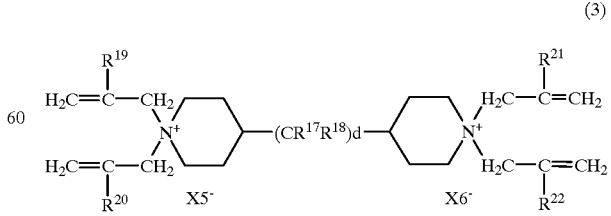

(3)

wherein $R^{17}$ and $R^{18}$ are the same or different and each represents a hydrogen or halogen atom or a $C_{1-10}$ alkyl or hydroxyl group, $R^{19}$, $R^{20}$, $R^{21}$ and $R^{22}$ are the same or different and each represents a hydrogen or halogen atom or a methyl or ethyl group; $X5^-$ and $X6^-$ are the same or different and each represents a halide ion, a hydroxide ion or an organic or inorganic acid anion and d represents an integer of 0 to 10.

In a fourth aspect, the invention is related to a method of producing the crosslinked polymer of the first aspect of the invention which comprises the step of suspension polymerization of a monomer composition comprising a monomer represented by the following general formula (4):

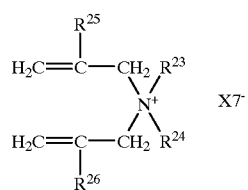

(4)

wherein $R^{23}$ and $R^{24}$ are the same or different and each represents a $C_{1-10}$ alkyl group; $R^{25}$ and $R^{26}$ are the same or different and each represents a hydrogen or halogen atom or a methyl or ethyl group; and $X7^-$ represents a halide ion, a hydroxide ion or an organic or inorganic acid anion, and a crosslinking agent represented by the general formula (3)

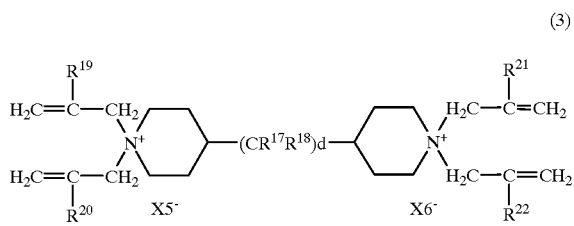

(3)

wherein $R^{17}$ and $R^{18}$ are the same or different and each represents a hydrogen or halogen atom or a $C_{1-10}$ alkyl or hydroxyl group; $R^{19}$, $R^{20}$, $R^{21}$ and $R^{22}$ are the same or different and each represents a hydrogen or halogen atom or a methyl or ethyl group; $X5^-$ and $X6^-$ are the same or different and each represents a halide ion, a hydroxide ion or an organic or inorganic acid anion; and d represents an integer of 0 to 10.

In a fifth aspect, the invention is related to a method of producing the crosslinked polymer of the second aspect of the invention which comprises the step of quaternizing a crosslinked polymer having at least one crosslink structure and a tertiary amine structure and/or a quaternary ammonium salt structure at least one crosslink structure being represented by the general formula (5):

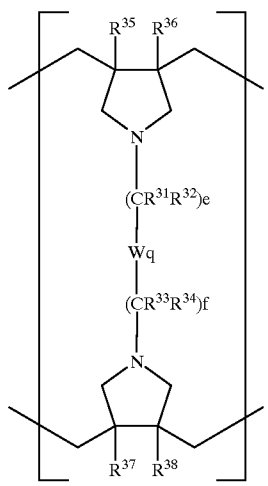

(5)

wherein $R^{31}$, $R^{32}$ $R^{33}$ and $R^{34}$ are the same or different and each represents a hydrogen or halogen atom or a $C_{1-10}$ alkyl or hydroxyl group; $R^{35}$, $R^{36}$, $R^{37}$ and $R^{38}$ are the same or different and each represents a hydrogen or halogen atom or a methyl or ethyl group; e and f are the same or different and each represents an integer of 0 to 10; and q represents 0 or 1 provided that the relation e+f+q≧1 should be satisfied; W represents an —NH—, —N(CH$_3$)—, —NH—(CH$_2$)$_3$—NH—, —NH—(CH$_2$)$_4$—NH—, —O—, —CH(OH)—, —O—CH$_2$—C(CH$_3$)$_2$—CH$_2$—O—, —O—(CH$_2$)$_2$—(O—CH$_2$—CH$_2$)$_m$—O—, 1,4-piperazinylene, 3-methyl-2,6-pyridyl, 4-methyl-2,6-pyridyl, 2,6-pyridyl or 2,5-pyridyl group and m represents an integer of not less than 0.

In a sixth aspect, the invention is related to a method of producing a spherical particle in a medium wherein said medium comprises a viscous fluid.

In a seventh aspect, the invention is related to a method of using the above-mentioned crosslinked polymer in a reaction step wherein the reaction step is a step of carrying out an ion exchange reaction or a step of carrying out a reaction for activating an active hydrogen atom in an active hydrogen-containing compound.

In an eighth aspect, the invention is related to a method of producing a hydroxy alkyl (meth) acrylate by the reaction of a (meth)acrylic acid with an oxirane compound, wherein the above crosslinked polymer is used as a catalyst.

In a ninth aspect, the invention is related to a method of producing glycols by the reaction of water with an oxirane compound, wherein the above crosslinked polymer is used as a catalyst.

In a tenth aspect, the invention is related to a method of producing glycols by the reaction of an oxirane compound with water in the presence of a crosslinked polymer wherein the crosslinked polymer comprises an organic high-molecular compound having a hetero atom, as an essential member, in the main chain and/or crosslink structure, said organic high-molecular compound not having a hydrogen directly bonded to a hetero atom.

DETAILED DISCLOSURE OF THE INVENTION

In the following, the present invention is described in detail.

The crosslinked polymer according to the first or second aspect of the invention has at least one crosslink structure and has a tertiary amine structure and/or a quaternary ammonium salt structure. The crosslinked polymer according to the first aspect of the invention has at least one crosslink structure represented by the general formula (1) while the crosslinked polymer according to the second aspect of the invention has at least one crosslink structure represented by the general formula (2). The crosslink structure(s) in such crosslinked polymer is(are) formed intramolecularly and/or intermolecularly in the corresponding high-molecular compound.

The crosslink structure represented by the general formula (1) or (2) has a quaternary ammonium salt structure, which results from direct bonding of substituent-constituting four atoms to a nitrogen atom, which constituents a saturated five-membered heterocyclic group, in each site (crosslinking site) located at each of both base points (termini) of that structure and having a trifurcated structure. The term "high-molecular compound" as used herein collectively refers to polymers and compounds having a molecular weight distribution; it does not mean that the molecular weight should be not less than a specific value. In the above crosslinked polymer, the "crosslink structure" means a structure which binds main chains to each other, and the crosslink structure comprises a structure including portions constituting main chains and a crosslink portion linking those portions together. Such main chains and crosslink structure are generally bonded together by covalent bonding. By having such a crosslink structure, the crosslinked polymer has an increased level of mechanical strength.

Thus, in the crosslinked polymer having a crosslink structure represented by the above general formula (1), one trifurcated structure-constituting crosslinking site in said crosslink structure has a quaternary ammonium salt structure represented by the following general formula (6):

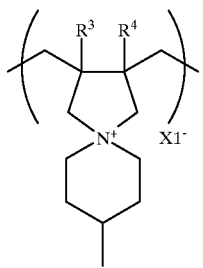

(6)

and the other crosslinking site has a quaternary ammonium salt structure represented by the following general formula (7):

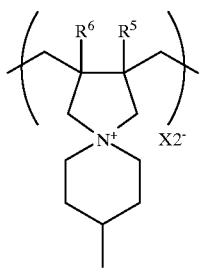

(7)

In the crosslinked polymer having a crosslink structure represented by the general formula (2), one trifurcated structure-constituting crosslinking site in the crosslink structure has a quaternary ammonium salt structure represented by the following general formula (8):

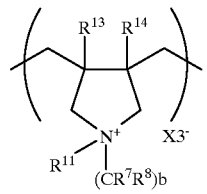

(8)

and the other crosslinking site has a quaternary ammonium salt structure represented by the following general formula (9):

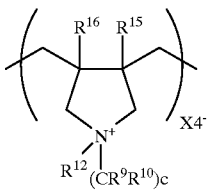

(9)

In the present specification, the repeating units represented by such a chemical structure as —$(CR^1R^2)$— or the like may be the same or different and the substituents represented by $R^1$, $R^2$ and so forth in such repeating units may be constituted in the same manner or in a different manner in each repeating unit or per repeating unit. The repeating units may be bound together either blockwise or at random. The halogen atom is not particularly restricted but includes, among others, fluorine, chlorine, bromine and iodine. The $C_{1-10}$ alkyl group is not particularly restricted but includes, among others, methyl, ethyl, n-propyl, isopropyl, n-butyl, isobutyl, tert-butyl, pentyl, hexyl, heptyl, octyl, nonyl and decyl. Further, the organic acid anion or inorganic acid anion means an anion resulting from elimination of at least one hydrogen ion from an organic acid or inorganic acid. As the inorganic acid anion, for instance, there may be mentioned sulfate, phosphonate, borate, cyanide, carbonate, hydrogen carbonate, thiocyanate, thiosulfonate, sulfite, hydrogen sulfite, nitrate, cyanate, phosphate, hydrogen phosphate, metalate (e.g. molybdate, tungstate, metavanadate, pyrovanadate, hydrogen pyrovanadate, niobate, tantalate, perrhenate, etc.), tetrafluoroaluminate, tetrafluoroborate, hexafluorophosphate and tetrachloroaluminate, $Al_2Cl_7^-$ ions and the like. As organic acid anions, there may be mentioned sulfonate, formate, oxalate, acetate, (meth) acrylate, trifluoroacetate, trifluoromethanesulfonate and bis(trifluoromethanesulfonate)amide, $(CF_3SO_2)_3C^-$ anions and the like.

Among the crosslinked polymers having a crosslink structure represented by the above general formula (1), those in which, in general formula (1), the substituents represented by $R^1$, $R^2$, $R^3$, $R^4$, $R^5$ and $R^6$ each is a hydrogen atom and a is 3 are preferred and those in which the anions represented by X1$^-$ and X2$^-$ each is a chloride ion are particularly preferred.

Among the crosslinked polymers having a crosslink structure represented by the above general formula (2), those in which, in general formula (2), the substituents represented by $R^7$, $R^8$, $R^9$, $R^{10}$, $R^{13}$, $R^{14}$, $R^{15}$ and $R^{16}$ each is a hydrogen atom, b, c and p each is 1 and the substituent represented by Z is —CH(OH)— are preferred and those in which the anions represented by X3$^-$ and X4$^-$ each is a chloride ion are particularly preferred. In the present specification, the 1,4-piperazinylene, 3-methyl-2,6-pyridyl, 4-methyl-2,6-pyridyl, 2,5-pyridyl and 2,6-pyridyl groups are respectively represented by the following chemical formulas (1) to (5):

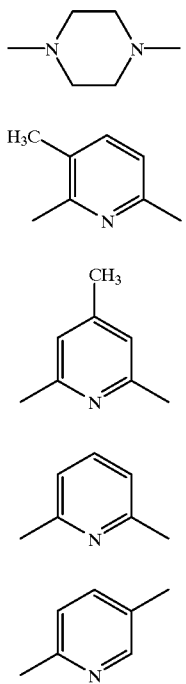

In the first and second aspects of the invention, the tertiary amine structure and/or quaternary ammonium salt structure which the crosslinked polymer has in addition to the above-mentioned crosslink structure functions as an ion exchanging group when the crosslinked polymer is used in an ion exchange reaction and, when the polymer is used as a catalyst, namely when the polymer is used in a reaction for activating an active hydrogen atom in an active hydrogen-containing compound, that structure functions as a catalytic active site. The thermal decomposition resistance of such crosslinked polymer is markedly improved by the above crosslink structure which the polymer has, and the polymer can be used at elevated temperatures and shows great ion exchange capacity and/or high catalytic activity.

The above tertiary amine structure and/or quaternary ammonium salt structure is preferably a cyclic structure. In such quaternary ammonium salt structure, the nitrogen atom preferably forms a spiro ring structure. The cyclic structure is less susceptible to oxidative decomposition than an aliphatic structure and therefore still more improves the thermal decomposition resistance of the crosslinked polymer. As the form of such a cyclic structure, there may be mentioned a five-membered ring, a six-membered ring and so forth and, among them, a five-membered ring is preferred. The structure is preferably formed by a diallyldimethylammonium salt, since this makes it easy to form the main chain from an ammonium salt structure-containing repeating unit as a main constituent.

The occurrence ratio between the tertiary amine structure and/or quaternary ammonium salt structure and the crosslink structure in the above crosslinked polymer may appropriately be selected according to the desired ion exchange capacity and/or catalytic activity and the resistance to thermal decomposition, among others, hence is not particularly restricted. Preferably, however, the mole ratio between the tertiary amine structure and/or quaternary ammonium salt structure and the crosslink structure (structural unit) represented by the above general formula (1) or (2), namely the ratio [tertiary amine structure and/or quaternary ammonium salt structure:crosslink structure represented by general formula (1) or (2)], is, for example, within the range of 0.5:0.5 to 0.99:0.01. When the crosslink structure represented by general formula (1) or (2) is in excess of 0.5:0.5, the crosslink density becomes excessive and, when the crosslinked polymer is used as a catalyst, for instance, the rate of reaction may possibly decrease. When the proportion of the crosslink structure represented by general formula (1) or (2) is less than 0.99:0.01, the crosslink density becomes too low and, when the crosslinked polymer is used as a catalyst, for instance, the active site density per unit volume may be insufficient or the physical strength of the crosslinked polymer may insufficient and/or other inconveniences may possibly be caused. More preferably, the mole ratio between the tertiary amine structure and/or quaternary ammonium salt structure and the crosslink structure represented by the above general formula (1) is within the range of 0.80:0.20 to 0.95:0.05 and the mole ratio between the tertiary amine structure and/or quaternary ammonium salt structure and the crosslink structure represented by the above general formula (2) is within the range of 0.70:0.30 to 0.90:0.10.

The above-mentioned preferred mole ratio ranges each is the value for the cases where the crosslinked polymer comprises the tertiary amine or quaternary ammonium salt and the crosslink structure represented by general formula (1) or (2) alone.

The crosslinking agent (nitrogen-containing crosslinking agent) in accordance with the third aspect of the invention is represented by the above general formula (3).

The crosslinking agent represented by general formula (3) is an N, N, N', N'-tetraallylammonium derivative containing two diallylpiperidyl groups in one and the same molecule and is a novel nitrogen-containing crosslinking agent in which the nitrogen atom bonded to the allyl groups constituting each diallylammonium group (diallyl quaternary ammonium salt structure) is participating in the formation of each heterocyclic ring structure. Such crosslinking agent can be used in carrying out various crosslinking reactions and can appropriately be used as a raw material in the production of the crosslinked polymer according to the first aspect of the present invention. Thus, such crosslinking agent can contribute to the formation of a high-molecular compound (polymer) in which a crosslink structure is to be formed and, at the same time, can function as a crosslinking agent for crosslinking high-molecular compounds formed on the side of allyl groups bonded to the above-mentioned diallyl quaternary ammonium salt structure-constituting nitrogen atom, namely on the diallylpiperidyl group-constituting allyl group side, mutually, to give the crosslinked polymer according to the first aspect of the invention.

The method of producing the crosslinked polymer according to the first or second aspect of the invention is now described.

The crosslinked polymer according to the first aspect of the invention can readily be produced, for example, by the method of producing crosslinked polymers in accordance with the fourth aspect of the invention. Thus, it can be produced by the method of producing crosslinked polymers which comprises a step of subjecting a monomer composition comprising a monomer represented by the above general formula (4) and a crosslinking agent represented by the above general formula (3) to suspension polymerization (hereinafter referred to also as "suspension step"). In this case, the four atoms directly bonded to the nitrogen atom constituting the quaternary ammonium salt structure which the crosslinked polymer according to the first aspect of the invention has may constitute a part of the crosslinked polymer-constituting high-molecular compound or may be a part derived from the crosslinking agent (nitrogen-containing crosslinking agent) represented by the above general formula (3).

The monomer represented by general formula (4), namely diallyldialkylammonium salt, constitutes the above-mentioned tertiary amine structure and/or quaternary ammonium salt structure in the crosslinked polymer according to the first aspect of the invention, and the monomer in which, in general formula (4), the substituents represented by $R^{23}$ and $R^{24}$ each is a methyl group and the anion represented by $X7^-$ is a chloride ion, namely diallyldimethylammonium chloride, is most preferred.

The crosslinking agent having the structure represented by general formula (3) constitutes the crosslink structure represented by general formula (1) in the crosslinked polymer according to the first aspect of the invention, and the ones in which, in general formula (3), the substituents represented by $R^{17}$, $R^{18}$, $R^{19}$, $R^{20}$, $R^{21}$ and $R^{22}$ each is a hydrogen atom and d is 3 are preferred and the one in which, further, the anions represented by $X5^-$ and $X6^-$ each is a chloride ion, namely N, N, N',N'-tetraallyldipiperidylpropanium dichloride, is most preferred.

The proportion between the monomer represented by general formula (4) and the crosslinking agent represented by general formula (3) to be used may appropriately be selected according to the desired ion exchange capacity and/or catalytic activity, the resistance to thermal decomposition and other factors. Preferably, the proportion is selected so that it is within the range of the mole ratio between the tertiary amine structure and/or quaternary ammonium salt structure and the crosslink structure (structural unit) represented by general formula (1) or (2). Thus, the mole ratio between the monomer represented by the general formula (4) and the crosslinking agent represented by the general formula (3), namely the mole ratio [monomer of the general formula (4): crosslinking agent of the general formula (3)], is preferably within the range of 0.5:0.5 to 0.99:0.01, more preferably within the range of 0.80:0.20 to 0.95:0.05.

In the production of the crossliked polymer of the first aspect of the invention, the concentration of monomers is not particularly restricted, but is preferably 30 to 80% by weight, more preferably 50 to 60% by weight. At such concentration, it is possible to obtain a crosslinked polymer having a sufficiently increased apparent specific gravity by polymerizing the monomers and, as a result, a crosslinked polymer high in strength and excellent in ion exchange capacity and/or catalytic activity can be obtained. At a concentration below 30% by weight, the apparent specific gravity cannot be increased to a sufficient extent, so that the ion exchange capacity, catalytic activity and strength will remain low. At above 80% by weight, it is difficult, for example, to adjust the concentration of the monomer solution and/or to stably suspend droplets of the monomers in suspension polymerization of the monomers in the particle form, with the result that the crosslinked polymer can hardly be granulated.

If necessary, the above monomer composition may further comprise a monomer copolymerizable with the monomer of the general formula (4) and/or the crosslinking agent of the general formula (3) (hereinafter, copolymerizable monomer) in an amount which will not impair the performance characteristics of the product crosslinked polymer. As such copolymerizable monomer, there may be mentioned, among compounds having a double bond, acrylamide, acrylic acid, maleic acid, styrene, ethylene and vinyl ethers, for instance. These may be used singly or two or more of them may be used in combination. The proportion of the above copolymerizable monomer in the monomer composition is not particularly restricted but may appropriately be selected according to the ion exchange capacity, catalytic activity, resistance to thermal decomposition and other properties desired of the final product crosslinked polymer.

The reaction conditions and other conditions to be employed in the above-mentioned suspension step are not particularly restricted but, as the dispersion medium to be used in the suspension polymerization of the above monomer composition, for instance, there may be mentioned saturated chain hydrocarbons such as pentane, (n-)hexane and heptane; alicyclic hydrocarbons such as ligroin and cyclohexane; aromatic hydrocarbons such as benzene, toluene and xylene; and so forth. Among these, toluene is preferred in view of its industrial general purpose properties. The amount of the dispersion medium is not particularly restricted. The suspending agent to be used in carrying out the suspension polymerization includes, among others, carboxylic acid glycerides, typically fatty acid glycerides, and sorbitan esters. The species and amount thereof are not particularly restricted, however. Furthermore, for stably maintaining the suspended state of the monomer composition, a precipitation inhibitor selected from among gelatin, dextrin, polyvinyl alcohol, ethylcellulose and the like may also be used.

In the above suspension step, a polymerization initiator can be used. The polymerization initiator specifically includes, among others, peroxide initiators such as hydrogen peroxide, benzoyl peroxide and cumene hydroperoxide; azo compounds (azo initiators) such as 2,2'-azobis (isobutyronitrile) and 2,2'-azobis(2-amidinopropane) dihydrochloride; persulfate salts (persulfate initiators) such as ammonium persulfate, sodium persulfate and potassium persulfate; and like radical polymerization initiators. Azo initiators are preferred to persulfate initiators since the former do not leave sulfur, which may act as a catalyst poison in certain reactions. These may be used singly or two or more of them may be used in combination. In lieu of the above polymerization initiators, irradiation with radiations, electron beams, ultraviolet rays and the like may be employed. The polymerization initiators may be used in combination with the irradiation with such radiations, electron beams, ultraviolet rays or the like. The amount of the polymerization initiator is not particularly restricted.

The reaction temperature in carrying out the above polymerization reaction is not particularly restricted but may appropriately be selected according to the monomer composition, the dispersion medium and other factors. The reaction time can appropriately be selected so that the above polymerization reaction may be complete, according to the reaction temperature, monomer composition, polymerization initiator and dispersion medium, or the combination thereof, and the amounts thereof, among others. The reaction pressure is not particularly restricted but the reaction can be carried out at ordinary pressure (atmospheric pressure), under reduced pressure or under elevated pressure.

The crosslinked polymer according to the first aspect of the invention as obtained according to the fourth aspect of the invention has a spherical (pearl-like) shape with a desired particle size, shows good heat resistance and shows a great treatment capacity as an ion exchanger, such as an ion exchange resin, or as a catalyst for activating an active hydrogen atom in an active hydrogen-containing compound, for instance. For use as such an ion exchanger or activation catalyst as mentioned above, the crosslinked polymer according to the first aspect of the invention is preferably insoluble in solvents, hence readily separable and is desirably permeable to liquid when packed in a column. The spherical crosslinked polymer obtained by the method mentioned above constitutes a desirable mode of embodiment of the present invention.

The crosslinked polymer according to the second aspect of the invention can readily be produced by the method of producing crosslinked polymers in accordance with the fifth aspect of the invention. Thus, it comprises a step of quaternizing (hereinafter, quaternization step) a crosslinked polymer having at least one crosslink structure and a tertiary amine structure and/or a quaternary ammonium salt structure, and at least one crosslink structure can be produced by the method of producing crosslinked polymers the crosslink structure represented by the general formula (5) given above.

In the fifth aspect of the invention, the quaternization of a crosslinked polymer having at least one crosslink structure represented by the general formula (5) means that a reaction is carried out to obtain a quaternary ammonium salt structure represented by the above general formula (8) or (9) given above from a tertiary amine structure represented by the following general formula (10):

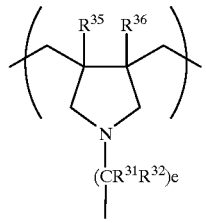

(10)

(wherein $R^{31}$ and $R^{32}$ are the same or different in each occurrence of the repeating unit or per repeating unit and each represents a hydrogen or halogen atom or a $C_{1-10}$ alkyl or hydroxyl group, $R^{35}$ and $R^{36}$ are the same or different and each represents a hydrogen or halogen atom or a methyl or ethyl group and e represents an integer of 0 to 10) or the following general formula (11):

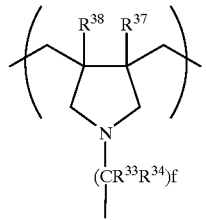

(11)

(wherein $R^{33}$ and $R^{34}$ are the same or different in each occurrence of the repeating unit or per repeating unit and each represents a hydrogen or halogen atom or a $C_{1-10}$ alkyl or hydroxyl group, $R^{37}$ and $R^{38}$ are the same or different and each represents a hydrogen or halogen atom or a methyl or ethyl group and f represents an integer of 0 to 10), respectively, and occurring at one of the trifurcated structure-constituting crosslinking sites in the crosslink structure represented by the above general formula (5).

The method of quaternizing the crosslinked polymer having at least one crosslink structure represented by the general formula (5) in the quaternization step is not particularly restricted but any of various methods known in the art can be employed. For example, the quaternization can readily be realized by using an organic halide as a quaternizing agent and reacting the quaternizing agent with the crosslinked polymer having at least one crosslink structure represented by the general formula (5) in the presence of a reaction solvent.

The organic halide to be used as the quaternizing agent is not particularly restricted but preferably is an alkyl halide, more preferably methyl iodide or ethyl iodide. Useful as the reaction solvent are polar solvents such as alcohols, among which methanol and ethanol are preferred. The amounts of the quaternizing agent, reaction solvent and so on and the reaction conditions such as reaction temperature, reaction pressure and reaction time are not particularly restricted but may appropriately be selected so that the above reaction can be completed. However, the reaction temperature is preferably not higher than the boiling points of the organic halides and reaction solvents to be used in the quaternization reaction.

The crosslinked polymer having at least one crosslink structure represented by the general formula (5), namely the crosslinked polymer to be used as the starting material (crosslinked polymer precursor) for the crosslinked polymer according to the second aspect of the invention, has at least one crosslink structure and has a tertiary amine structure and/or a quaternary ammonium salt structure, and the sites (crosslinking sites) located at the base points (termini) of the crosslink structure at at least one crosslinking point and having a trifurcated structure both have a tertiary amine structure composed of a nitrogen atom and substituent-constituting carbon atoms directly bonded thereto. The three carbon atoms directly bonded to and forming a tertiary amine structure with the nitrogen atom each may be a part of the high-molecular compound constituting the crosslinked polymer and at least one (generally one) of them may be derived from the crosslinking agent to be mentioned later herein referring to the method of production given later herein.

The crosslinking agent so referred to herein is a crosslinking agent having two or more functional reaction sites (namely, having two or more sites reactive with the high-molecular compound) and generally contributes to the formation of a crosslink structure with the nitrogen atom (namely, the nitrogen atom forming a tertiary amine structure located at the base point of a crosslink structure) and/or a carbon atom directly or indirectly bonded to the nitrogen atom as at least one target thereof. In certain cases, it may be a nitrogen-containing crosslinking agent, and the tertiary amine structure-forming nitrogen atom may be provided by that crosslinking agent.

The crosslinked polymer having at least one crosslink structure represented by the general formula (5), which is to be used in accordance with the fifth aspect of the invention, is not particularly restricted but preferably is a crosslinked polymer having a structural unit represented by the following general formula (12):

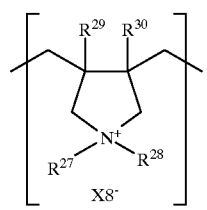

(12)

(wherein $R^{27}$ and $R^{28}$ are the same or different and each represents a $C_{1-10}$ alkyl group, $R^{29}$ and $R^{30}$ are the same or different and each represents a hydrogen or halogen atom or a methyl or ethyl group and $X8^-$ represents a halide ion, a hydroxide ion or an organic or inorganic acid anion) as a quaternary ammonium salt structure with the mole ratio between the structural unit represented by general formula (12) and the structural unit represented by general formula (5) (crosslink structure), namely the mole ratio [structural unit of the general formula (12): crosslink structure of the general formula (5)], preferably being within the range of 0.5:0.5 to 0.99:0.01, more preferably within the range of 0.70:0.30 to 0.90:0.10. When the above mole ratio is outside the above range, the same inconveniences as mentioned hereinabove referring to the crosslinked polymer according to the second aspect of the invention may possibly be encountered.

The method of producing the crosslinked polymer having at least one crosslink structure represented by the general formula (5), which is to be used in accordance with the fifth aspect of the invention, is not particularly restricted but, for example, that polymer can judiciously be prepared by a production method comprising a step of suspending a high-molecular compound in which said crosslink structure is to be formed in an inert organic solvent and a step of crosslinking the high-molecular compound with a crosslinking agent.

As the above high-molecular compound, there may be mentioned, among others, high-molecular compounds having both a structural unit represented by the above general formula (12) and a structural unit represented by the general formula (13)

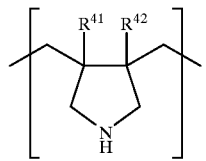

(13)

(wherein $R^{41}$ and $R^{42}$ are the same or different and each represents a $C_{1-10}$ alkyl group) as repeating units.

The mole ratio between the structural unit represented by general formula (12) and the structural unit represented by general formula (13) in the above high-molecular compound is not particularly restricted but, when the high-molecular compound is constituted by comprising the above two structural units alone, the mole ratio between the structural unit of the general formula (12) and the structural unit of the general formula (13) is preferably within the range of 0.50:0.50 to 0.99:0.01, more preferably within the range of 0.70:0.30 to 0.90:0.10.

As the high-molecular compound having a structural unit represented by the general formula (12) and a structural unit represented by the general formula (13), there may be mentioned, among others, alkali neutralization products derived from a copolymer obtained by copolymerizing diallyldimethylammonium chloride (DADMAC) and diallylamine hydrochloride (DAAHC) (poly-DADMAC/DAAHC; hereinafter also referred to as "polydiallylamine derivative"). When the polydiallylamine derivative as a precursor of the high-molecular compound is composed of diallyldimethylammonium chloride and diallylamine hydrochloride, the mole ratio therebetween is preferably in the range of 5:95 to 95:5.

The above polydiallylamine derivative may be a random copolymer or may have various structures such as an alternating copolymer or block copolymer structure. Alkali-neutralization products derived from a copolymer comprising, in addition to diallyldimethylammonium chloride and diallylamine hydrochloride, another monomer copolymerizable therewith as a monomer constituent are also suited for use as the above high-molecular compound. As specific examples of the other monomer copolymerizable with those monomers, there may be mentioned acrylamide, acrylic acid and maleic acid, among others. The contents of diallyldimethylammonium chloride, diallylamine hydrochloride and the other monomer in the monomer composition are not particularly restricted but may appropriately selected according to the ion exchange capacity or catalytic activity, resistance to thermal decomposition and other properties desired of the final product crosslinked polymer.

The method of suspending the above high-molecular compound in an inert organic solvent is not particularly restricted but, generally and preferably, a high-molecular compound solution (aqueous solution) is prepared by dispersing and dissolving the high-molecular compound in water (or an aqueous solution containing sodium hydroxide or the like) as a solvent and this solution is suspended in an inert organic solvent in the presence of a suspending agent. Further, when necessary, a mixed solvent may also be used which is prepared by adding a water-miscible organic solvent such as methyl alcohol to the water for dissolving the high-molecular compound. This mixed solvent is required to satisfy the conditions that the high-molecular compound is soluble therein and that the mixed solvent with the high-molecular compound dissolved therein (i.e. high-molecular compound solution) is immiscible with the inert organic solvent (namely, the high-molecular compound solution occurs as suspended particles in the inert organic solvent).

The concentration of the above high-molecular compound solution, namely the content of the high-molecular compound dissolved in the high-molecular compound solution, is very important as a factor determinative of the strength and performance characteristics (in particular ion exchanging intensity) of the crosslinked polymer finally obtained. Therefore, this concentration is preferably as high as possible so long as the high-molecular compound is soluble in the above-mentioned solvent (which may be a mixed solvent), more preferably 30 to 70% by weight, still more preferably 30 to 50% by weight.

Even when the concentration of the high-molecular compound solution is lower than a desired level, it is possible to increase the concentration of the high-molecular compound solution by a method comprising, for example, (1) concentrating the high-molecular compound solution in advance using an evaporator or the like and then suspending the concentrated high-molecular compound solution in an inert organic solvent or (2) concentrating the high-molecular compound solution in a state suspended in an inert organic solvent by utilizing the phenomenon of azeotropy of the inert organic solvent and the solvent mentioned above.

The alkali-neutralized polydiallylamine derivative mentioned above, for instance, can be prepared generally by mixing an aqueous solution of diallyldimethylammonium chloride with an aqueous solution of diallylamine hydrochloride and, after carrying out polymerization, neutralizing the polymerization mixture with an alkali. Thus, both the raw materials are available as aqueous solutions and therefore the raw materials concentration is limited. As a result, the content of the alkali neutralization product as a solid matter in the aqueous high-molecular compound solution thus prepared generally amounts to only about 30% by weight. However, when the concentration of the aqueous high-molecular compound solution is increased by the method mentioned above by way of example, the content of the alkali neutralization product can be increased up to about 50% by weight.

In certain cases, it is also possible to obtain a highly concentrated aqueous high-molecular compound solution by concentrating a solution of raw materials of the high-molecular compound (monomer composition-containing solution) by the method mentioned above by way of example and then preparing the high-molecular compound.

The inert organic solvent in which the above high-molecular compound is to be suspended in not particularly restricted but includes, among others, saturated chain hydrocarbons such as pentane, (n-) hexane and heptane; alicyclic hydrocarbons such as ligroin and cyclohexane; aromatic hydrocarbons such as benzene, toluene and xylene; and so forth. Among the inert organic solvents mentioned above, toluene is more preferred.

The suspending agent for suspending the high-molecular compound in the inert organic solvent is not particularly restricted, either, but includes, among others, carboxylic acid glycerides, typically fatty acid glycerides such as glycerol palmitate, glycerol (mono)stearate, glycerol oleate and glycerol linoleate; sorbitan esters such as sorbitan monopalmitate, sorbitan monostearate and sorbitan monooleate; and so forth.

For stably maintaining the suspended particles of the high-molecular compound solution in the inert organic solvent, the use of a precipitation inhibitor is generally preferred. As such a precipitation inhibitor, there may be mentioned those known precipitation inhibitors which are used in reversed phase suspension polymerization. More specifically, there may be mentioned starch; gelatin; cellulose derivatives such as ethylcellulose; polyvinyl alcohol; and so forth. Among them, ethylcellulose and polyvinyl alcohol are more preferred.

The crosslinking agent to be used in crosslinking the above high-molecular compound specifically includes, but is not limited to, epoxy compounds such as epichlorohydrin and various diepoxy compounds; dichloro compounds such as 1,4-dichlorobutane and 1,2-bis(2-chloroethoxy)ethane; dibromo compounds such as 1,2-dibromobutane and 1,4-dibromobutane; dialdehyde compounds such as glyoxal and glutaraldehyde; and so forth. It is possible to form a desirable crosslink structure by applying epichlorohydrin, among the crosslinking agents mentioned above byway of example, to the above-mentioned alkali-neutralized polydiallylamine derivative.

The amounts of the above-mentioned crosslinking agent, inert organic solvent, suspending agent and precipitation inhibitor each is not particularly restricted. The reaction temperature and other conditions in the crosslink structure formation reaction are not particularly restricted, however it is preferably carried out at 40 to 90° C.

When the crosslinked polymer having at least one structural unit represented by the general formula (5) is produced as the precursor of the crosslinked polymer by the above-mentioned production method according to the fifth aspect of the invention, it is also possible, if necessary, to wash the obtained crosslinked polymer with a polar solvent in which "inorganic salts" are soluble. By this, it becomes possible to obtain a basic crosslinked polymer having higher levels of ion exchange capacity and strength.

The "inorganic salts" mentioned above mean inorganic salts formed upon neutralization, with an alkali, of the diallylamine hydrochloride moiety contained in the polydiallylamine derivative. For example, when the alkali neutralization is carried out using sodium hydroxide (NaOH), sodium chloride (NaCl) is the inorganic salt.

The polar solvent to be used in washing the crosslinked polymer depends on the inorganic salt species. Generally, however, it includes water; hydrophilic alcohols such as methyl alcohol and glycerol; dimethylformamide; dimethylacetamide; dimethyl sulfoxide; N-methylpyrrolidone; and so on. More specifically, when the inorganic salt is NaCl, water, glycerol, methyl alcohol and the like are preferred as the polar solvent and, among them, water is most preferred from the solubility viewpoint.

The method of producing the crosslinked polymer having at least one structural unit represented by the general formula (5) is not particularly restricted to the production method mentioned above. As another example, there may be mentioned the method which comprises subjecting to suspension polymerization a monomer composition comprising a monomer represented by the general formula (14):

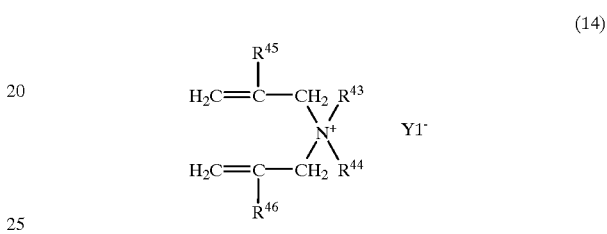

(14)

(wherein $R^{43}$ and $R^{44}$ are the same or different and each represents a $C_{1-10}$ alkyl group; $R^{45}$ and $R^{46}$ are the same or different and each represents a hydrogen or halogen atom or a methyl or ethyl group; and $Y1^-$ represents a halide ion, a hydroxide ion or an organic or inorganic acid anion) and a monomer represented by the general formula (15):

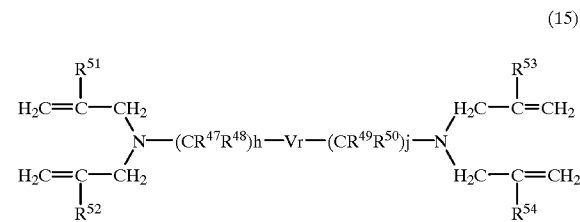

(15)

(wherein $R^{47}$, $R^{48}$, $R^{49}$ and $R^{50}$ may be the same or different in each occurrence of the repeating unit or per repeating unit and each represents a hydrogen or halogen atom or a $C_{1-10}$ alkyl or hydroxyl group; $R^{51}$, $R^{52}$, $R^{53}$ and $R^{54}$ are the same or different and each represents a hydrogen or halogen atom or a methyl or ethyl group; h and j are the same or different and each represents an integer of 0 to 10; and r represents 0 or 1 provided that the relation h+j+r≧1 should be satisfied, V represents an —NH—, —N(CH$_3$)—, —NH—(CH$_2$)$_3$—NH—, —NH—(CH$_2$)$_4$—NH—, —O—, —CH(OH)—, —O—CH$_2$—C(CH$_3$)$_2$—CH$_2$—O—, —O—(CH$_2$)$_2$—(O—CH$_2$—CH$_2$)$_k$—O—, 1,4-piperazinylene, 3-methyl-2,6-pyridyl, 4-methyl-2,6-pyridyl, 2,6-pyridyl or 2,5-pyridyl group and k represents an integer of not less than 0.

More specifically, the monomer represented by the general formula (15) contains two diallylamino groups in one and the same molecule and is a nitrogen-containing crosslinking agent contributing to the formation of the above-mentioned tertiary amine structure. It contributes to the formation of a high-molecular compound (polymer) in which a crosslink structure is to be formed and, at the same time, functions also as a crosslinking agent for mutually crosslinking the high-molecular compounds as formed on the respective diallylamino group sides.

The monomer represented by the general formula (15) specifically includes, but is not limited to, N,N,N',N'-tetraallyl-1,4-diaminobutane, N,N,N',N'-tetraallyldiaminoethane and the like.

The monomer represented by the general formula (15) can be readily obtained by tetraallylating a diamine such as 1,2-diaminopropane, 1,3-diaminopropane, 1,2-diaminobutane, 1,4-diaminobutane, 1,9-nonanediamine, iminobispropylamine, methyliminobispropylamine, N,N'-bis(aminopropyl)-1,3-propylenediamine, N,N'-bis(aminopropyl)-1,4-butylenediamine, bis(3-aminopropyl) ether, 1,2-bis(3-aminopropoxy)ethane, 1,3-bis(3-aminopropyl)-2,2-dimethylpropane, α, ω-bis(3-aminopropyl) polyethylene glycolether, bis(aminopropyl))-piperazine, 2,3-diaminopyridine, 2,5-diaminopyridine, 2,6-diaminopyridine or 2,6-diamino-4-methylpyridine.

In V of the above general formula (15), Z of the above general formula (2) and W of the above general formula (5), the number of occurrences of each repeating unit as represented by k, n or m is not particularly restricted from the production method viewpoint but the distance between neighboring crosslinking points and the degree of swelling of the crosslinked polymer tend to increase as the values of these increase. Therefore, from the viewpoint of easy handling and of performance such as ion exchange capacity or catalytic activity, the values of k, n and m each preferably is an integer of not less than 0 but not more than 14, more preferably an integer of not less than 0 but not more than 4.

The compound represented by the general formula (14), namely the diallyldialkylammonium salt, which is used as a raw material for the crosslinked polymer having at least one structural unit represented by the general formula (5) and constitutes the tertiary amine structure and/or quaternary ammonium salt structure which the crosslinked polymer having at least one structural unit represented by the general formula (5) has, is not particularly restricted but the compound in which the substituent represented by $R^{43}$ or $R^{44}$ each is a methyl group, the substituent represented by $R^{45}$ or $R^{46}$ each is a hydrogen and the anion represented by $Y1^-$ is a chloride ion, namely diallyldimethylammonium chloride is particularly preferred.

The proportion in use level between the monomer of the general formula (14) and the monomer of the general formula (15) is not particularly restricted but may be selected according to the ion exchange capacity, catalytic activity, thermal decomposition resistance and other properties desired of the final product crosslinked polymer. The molar ratio between the monomer of the general formula (14) and the monomer of the general formula (15) is preferably within the range of 0.70:0.30 to 0.90:0.10.

The above monomer composition may further comprise, according to need, a copolymerizable monomer copolymerizable with the monomer of the general formula (14) or/and (15) at an addition amount at which the performance characteristics of the product crosslinked polymer are not impaired. The copolymerizable monomer may comprise, for example, one or more of styrene, ethylene, vinyl ethers and the like. The proportion of the copolymerizable monomer in the monomer composition is not particularly restricted.

In a specific embodiment of the production of the crosslinked polymer having at least one structural unit represented by the general formula (5) by the above method, namely in carrying out the suspension polymerization of the above monomer composition, the same procedure as mentioned hereinabove referring to the suspension polymerization of the monomer composition comprising the above-mentioned monomers represented by the above general formulas (3) and (4) may be employed. In this case, the amounts of the dispersion medium, suspending agent, precipitation inhibitor, polymerization initiator and so on as well as the reaction conditions in carrying out the polymerization reaction, such as reaction temperature, reaction pressure and reaction time, are not particularly restricted but may appropriately be selected so that the polymerization reaction may be completed.

In producing the above crosslinked polymer, the concentration of the basic monomers is not particularly restricted but preferably is 30 to 80% by weight, more preferably 50 to 60% by weight. At such concentration, it is possible to obtain a basic crosslinked polymer having a sufficiently increased apparent specific gravity by polymerizing the basic monomers and, as a result, a basic crosslinked polymer high in strength and excellent in ion exchange capacity and/or catalytic activity can be obtained. At a concentration below 30% by weight, the apparent specific gravity cannot be increased to a sufficient extent, so that the ion exchange capacity, catalytic activity and strength will remain low. At above 80% by weight, it is difficult, for example, to adjust the concentration of the basic monomer solution and/or to stably suspend droplets of the basic monomers in suspension polymerization of the basic monomers in the particle form, with the result that the basic crosslinked polymer can hardly be granulated.

The crosslinked polymer according to the first or second aspect of the invention as obtained by the above-mentioned method of production is excellent in resistance to thermal decomposition owing to the structure of crosslinking points, in particular the structure of the crosslinking sites mentioned above. Therefore, the tertiary amine structure and the quaternary ammonium salt structure, among others, which such crosslinked polymer has, can be prevented from being eliminated (thermally decomposed).

Referring to the crosslinked polymer according to the first or second aspect of the invention, the resistance to thermal decomposition means the thermal decomposition temperature of the crosslinked polymer and high (or improved) resistance to thermal decomposition means that the thermal decomposition temperature of the crosslinked polymer is higher (or improved) as compared with the conventional crosslinked polymers in general. The thermal decomposition temperature of a crosslinked polymer means the endothermic peak temperature observed as a result of decomposition of the crosslinked polymer and determined from the thermogravimetry-differential thermal analysis (TG-DTA) curve recorded by heating the crosslinked polymer in a thermal analysis apparatus in a stream of nitrogen at a programming rate of 5° C./min.

A preferred embodiment of the method of producing the crosslinking agent according to the third aspect of the invention is now described.

The crosslinking agent represented by the above general formula (3) can readily be produced by reacting a compound represented by the following general formula (16):

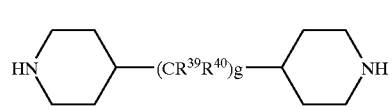

(16)

(wherein $R^{39}$ and $R^{40}$ are the same or different and each represents a hydrogen or halogen atom or a $C_{1-10}$ alkyl or hydroxyl group and g represents an integer of 0 to 10) with an allyl halide in the presence of a reaction solvent to give a compound resulting from introduction of one allyl group onto each piperidyl group-constituting nitrogen atom as a crosslinking agent precursor and then reacting the crosslinking agent precursor again with an allyl halide in the presence of a reaction solvent.

The above allyl halide is not particularly restricted but preferably is allyl chloride. The method of producing the crosslinking agent represented by the general formula (3), namely the method of reacting the compound of the general formula (16) with an allyl halide, is not particularly restricted but any of those various methods known in the art. The amounts of the allyl halide and solvent to be used in the above reaction as well as the rate of reaction, reaction time and other reaction conditions are not particularly restricted. After completion of the reaction, the crosslinking agent (nitrogen-containing crosslinking agent) produced can be recovered and purified from the reaction mixture in the conventional manner.

Among the compounds represented by the general formula (16), that compound in which, in general formula (16), the substituents represented by $R^{39}$ and $R^{40}$ each is a hydrogen atom and g is 3, namely 1,3-di(4-piperidyl)propane is particularly preferred.

The method of producing a spherical particle, which are suited for use in producing the above crosslinked polymer, according to the sixth aspect of the invention is now described. The method of producing a spherical particle according to the sixth aspect of the invention can be widely applied in the production of spherical particles in a medium which is in commercial practice. In producing organic spherical particles, for instance, that method can be applied in the polymerization of monomers in a medium or in the dispersion of polymers in a medium and, in producing inorganic spherical particles, it can be applied in the dispersion of an inorganic substance in a medium.

As specific examples of the above method of producing a spherical particle, there may be mentioned, among others, such a method of carrying out polymerization of monomers in a medium as the method of producing a spherical particle or particles, for example ion exchange resins or water-absorbing resins, which comprises carrying out emulsion polymerization or suspension polymerization in a medium, and such a method of dispersing an inorganic substance in a medium as the method of producing silica gel particles which comprises dropping water glass into a medium.

In the above-mentioned method of carrying out polymerization of monomers in a medium, the polymerization is generally effected by dispersing monomer droplets in a medium. In this case, the polarity of monomer droplets and the polarity of the medium are not particularly restricted. For example, the monomer droplets may be lower or higher in polarity than the medium. When the monomer droplets are higher in polarity than the medium, the polymerization becomes reversed phase polymerization and, in this case, the spherical particles formed may be high in agglomerating property and tend to give agglomerate bodies in certain instances. In such case, the production method according to the sixth aspect of the invention is judiciously applied. As a mode of reversed phase polymerization, there is, for example, the case where a water-insoluble organic solvent is used as the medium and suspension polymerization, for instance, is carried out while dispersing water-soluble monomer droplets or droplets of an aqueous solution containing water-soluble monomers in that medium.

The polymerization conditions, dispersing conditions, usable raw materials, such as monomers, polymerization initiator and additives, in the above method of producing a spherical particle in a medium are not particularly restricted but may appropriately be selected according to the use, performance characteristics, quality and other properties of the product to be produced. The production method according to the sixth aspect of the invention may be applied to a conventional commercial method of producing a spherical particle, for instance.

In accordance with the six aspect of the invention, the medium comprises a viscous fluid. By this, it becomes possible to inhibit the agglomerating property of spherical particles formed or inhibit mutual adhesion of spherical particles to thereby prevent spherical particles from becoming agglomerate bodies. Thus, it becomes possible to produce uniform, high-quality spherical particles expediently at low cost and in high yields.

Although why the sixth aspect of the invention produces such effects is not certain, the following factors may be mentioned and it is supposed that these factors act synergistically.

(1) While it is difficult for spherical particles formed in a medium to stably exist in the medium since they generally have agglomerating property or adhere to one another, the viscous fluid contained in the medium and occurring around each spherical particle contributes to inhibit the agglomerating and/or adhering property of the spherical particles to thereby improve the stability thereof in the medium and, at the same time, the increases in the viscosity of the medium contribute to inhibition of the spherical particles formed to give agglomerate bodies; (2) The use of an additive(s) such as a suspending agent for preventing the spherical particles produced from becoming agglomerate bodies can be suppressed, the viscous fluid in the medium can be readily removed when the spherical particles are separated from the medium and vigorous stirring can be rendered unnecessary, so that higher-quality products can be obtained; (3) Since the use of additives is suppressed and no vigorous stirring is required, the spherical particles can expediently be prevented from becoming agglomerate bodies and the cost of production can be reduced.

The viscous fluid mentioned above is a fluid having higher viscosity at ordinary temperature than the media generally used in the in-medium production of spherical particles and, in accordance with the sixth aspect of the invention, the viscous fluid means a fluid having a sufficient level of viscosity to prevent spherical particles formed in a medium from becoming agglomerate bodies. In cases where water is used as the medium, it is essential that the viscous fluid is higher in viscosity at ordinary temperature than water. When an organic solvent is used as the medium, it is essential that the viscous fluid is higher in viscosity at ordinary temperature than the organic solvent employed. There may also be used those which have a solid form before addition to the medium but, when added to the medium, can become fluid upon stirring and/or warming according to need and can effectively increase the viscosity of the medium. As such, there may be mentioned, among others, solid paraffin waxes, and greases which are secondary products in the production of silicone oils. It is sufficient that the viscous fluid according to the sixth aspect of the invention be higher in viscosity at 25 to 50° C. than the medium. The viscosity thereof at elevated temperatures such as the polymerization temperature is not particularly restricted. The viscosity can be measured in terms of coefficient of viscosity or kinematic viscosity at ordinary temperature, for instance.

The above viscous fluid is preferably inert to the formation of spherical particles and preferably comprises a liquid paraffin and/or a silicone oil, for instance. By this, it becomes possible to produce the effects of the sixth aspect of the invention to the full and apply such invention appropriately to the production of organic spherical particles by carrying out polymerization of monomers in a medium or dispersing polymers in a medium, for instance, or to the production of inorganic spherical particles by dispersing an inorganic substance in a medium, for instance. When the above viscous fluid comprises a liquid paraffin and/or a silicone oil, the medium may further contain another viscous fluid unless the effects of the sixth aspect of the invention are lessened.

The above-mentioned liquid paraffin is not particularly restricted but may be any paraffin species which is liquid at ordinary temperature. Thus, for example, there may be mentioned saturated liquid hydrocarbons containing 12 to 50 carbon atoms, inclusive of n-paraffins, isoparaffins and naphthenes. Such commercial products as Moresco-White, Moresco-Bioless (both trademarks; products of Matsumura Sekiyu Kenkyusho), Stanol, Crystol, Esso White Oil, Purex (all trademarks; products of Esso Petroleum) and the like may also be used. These may be used singly or two or more of them may be used in combination. Preferred among these are those having a kinematic viscosity at 40° C. of 5 to 500 mm$^2$/s, more preferably 10 to 100 mm$^2$/s.

The above-mentioned silicone oil is not particularly restricted but may be any of those which are liquid at ordinary temperature and have a siloxane structure, for example polysiloxane oils such as dimethylsilicone oils. Modified silicone oils having such a functional group(s) as hydroxyl, carboxyl, amino, epoxy, cyano, mercapto, trifluoropropyl, chlorophenyl, long-chain alkyl and/or like group(s) or modified with a polyether or an alcohol may also be used. These may be used singly or two or more of them may be used in combination. Preferred among them are those having a kinematic viscosity at 40° C. of 5 to 100000 mm$^2$/s, more preferably 10 to 10000 mm$^2$/s.

In addition to those viscous fluids which comprises a liquid paraffin and/or a silicone oil, those which comprises an oil usable as a lubricant are also preferred.

The above-mentioned oil usable as a lubricant is not particularly restricted but includes, among others, diester type, polyalkylene glycol type, halogenated hydrocarbon type and other synthetic lubricants as well as liquid lubricants such as petroleum-based lubricants and fatty oils. These may be used singly or two or more of them may be used in combination. Preferably used among them are those having a kinematic viscosity at 40° C. of 5 to 100000 mm$^2$/s, more preferably 10 to 10000 mm$^2$/s.

The content of the above viscous fluid is not particularly restricted but may appropriately be selected according to the agglomerating property and adhesiveness of spherical particles, the medium species, the method of production and other factors. When the whole medium including the viscous fluid is taken as 100% by weight, the above content is preferably 0.1 to 50% by weight. The viscous fluid is preferably used in the production of spherical particles, such as ion exchange resins and water-absorbing resins, in a medium by emulsion polymerization or suspension polymerization, or in the production of silica gel particles by dropping water glass into a medium. By appropriately adjusting the amount of the viscous fluid in the system, it is possible to adjust the particle diameter of the spherical particles.

In the production method according to the sixth aspect of the invention, the viscosity of the medium containing the above viscous fluid is not particularly restricted but is only required to be higher as compared with the media in general use in the production of spherical particles therein. Thus, at an ordinary temperature, it is only required that the viscosity of the medium after addition of the viscous fluid be at least slightly higher as compared with the viscosity of the medium before addition thereof.

The method of incorporating the viscous fluid in the medium is not particularly restricted, either. Thus, for example, there may be mentioned the method which comprises mixing the medium with the viscous fluid in advance of the production of spherical particles; the method which comprises dropping the viscous fluid into the medium during the production of spherical particles; and the method which comprises adding the viscous fluid stepwise to the medium during the production of spherical particles, among others. In these methods, the content of the viscous fluid in the medium may be kept constant or may be varied.

In the method of producing a spherical particle according to the sixth aspect of the invention, the spherical particles produced in the medium are generally separated from the medium by filtration or the like method, if necessary washed with water, and dried, among others, to yield a product. The spherical particles in the medium as such may also be treated as a product. Thus, the form of the product is not particularly restricted. In cases where the spherical particles are separated from the medium, the viscous fluid-containing medium or the viscous fluid separated out of the medium may be reused.

The particle diameter of the spherical particles produced by the sixth aspect of the invention is not particularly restricted but the production method can appropriately be applied in the production of spherical particles having a mean particle diameter of 0.01 to 20 mm. When the mean particle diameter is less than 0.01 mm, it is difficult to recover the particles from the medium by filtration or a like procedure and, when it exceeds 20 mm, not only such spherical particles are difficult to produce but also they may not be fully prevented from becoming agglomerate bodies. In the case of inorganic particles, the mean particle diameter is more preferably 0.1 to 10 mm, still more preferably 1 to 5 mm, and, in the case of organic particles, it is more preferably 0.05 to 5 mm, still more preferably 0.1 to 2.5 mm. The mean particle diameter means the mean diameter of dry spherical particles in a state swollen in a solvent.

A preferred embodiment of the method of producing a spherical particle according to the sixth aspect of the invention is now described.

The method of producing a spherical particle according to the sixth aspect of the invention can widely be applied to the production of various spherical particles or particles, such as ion exchange resins, water-absorbing resins and like organic spherical particles as well as silica gels and other inorganic spherical particles, favorably in particular to the production of spherical particles by reversed phase suspension polymerization or reversed phase emulsion polymerization of amine compounds as monomers. As such production method, there may be mentioned, for example, (A) the method comprising subjecting an aqueous solution containing an ammonium compound represented by the general formula (17) shown below to copolymerization or homopolymerization using a water-insoluble organic solvent as a medium; and (B) the method comprising subjecting an aqueous solution containing an ammonium compound represented by the following general formula (17) and a compound having two or more diallylammonium groups in each molecule to copolymerization or homopolymerization using a water-insoluble organic solvent as a medium. In the method of producing a spherical particle according to the sixth aspect of the invention, a viscous fluid is contained in the water-insoluble organic solvent, which is the medium.

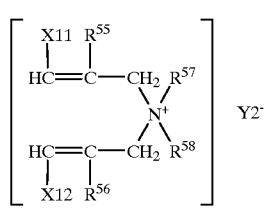

(17)

In the above general formula, $R^{55}$ and $R^{56}$ are the same or different and each represents a hydrogen atom, a methyl group, an ethyl group or a halogen atom, $R^{57}$ and $R^{58}$ are the same or different and each represents a hydrogen atom or an alkyl, hydroxyalkyl, carboxylalkyl, carboxyamidoalkyl or alkoxyalkyl group or $R^{57}$—$N^+$—$R^{58}$, in which $R^{57}$ and $R^{58}$ are combined, represents a piperidine ring or a morpholinium ring, X11 and X12 are the same or different and each represents a hydrogen atom, an alkyl group or a halogen atom and $Y2^-$ represents an anion.

The alkyl moiety in the above-mentioned alkyl, hydroxyalkyl, carboxyalkyl, carboxamidoalkyl and alkoxyalkyl groups preferably contains 1 to 18 carbon atoms. Such an alkyl group is not particularly restricted but includes, among others, those $C_{1-10}$ alkyl groups mentioned hereinbefore as well as undecyl, dodecyl, tridecyl, tetradecyl, pentadecyl, hexadecyl, heptadecyl, octadecyl, etc. More preferred are those containing 1 to 12 carbon atoms, still more preferably 1 to 8 carbon atoms, most preferably 1 to 6 carbon atoms.

One or more hydrogen atoms of the above piperidine ring and morpholinium ring may be substituted each by an alkyl group containing 1 to 13 carbon atoms.

As preferred examples of the ammonium compound represented by the above general formula, there may be mentioned, among others, diallyldialkylammonium chlorides such as diallyldimethylammonium chloride, diallyldiethylammonium chloride and diallylmethyl-β-hydroxyethylammonium chloride; and dimethallyldialkylammonium chlorides such as dimethallyldimethylammonium chloride. These may be used singly or two or more of them may be used in combination.

The above-mentioned compound having two or more diallylammonium groups is not particularly restricted but includes, among others, compounds represented by the formulas (18) to (31) as well as N,N'-dimethyl-N,N,N',N'-tetraallyl-2-butene-1,4-diammonium dichloride and the like. In lieu of these compounds or in combination with these compounds, there may be mentioned compounds having two or more paravinylphenylmethylammonium groups and/or metavinylphenylmethylammonium groups in each molecule, such as N,N'-di(paravinylphenylmethyl) ethylenediammonium dichloride, N,N'-di(metavinylphenylmethyl) ethylenediammonium dichloride, N,N'-di(paravinylphenylmethyl)propylenediammonium dichloride, N,N'-di(metavinylphenyl-methyl) propylenediammonium dichloride and the like. Those mentioned herein are typical examples and there may further be mentioned, for example, those compounds capable of synthesizing from phenylenediamine or other diamines and allyl chloride or allyl acetate. These may be used singly or two or more of them may be used in combination. The counter anion which these compounds have is not limited to the chloride but may be any other one.

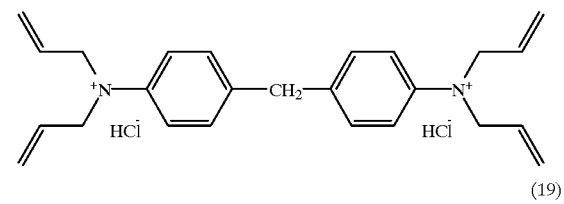

(18)

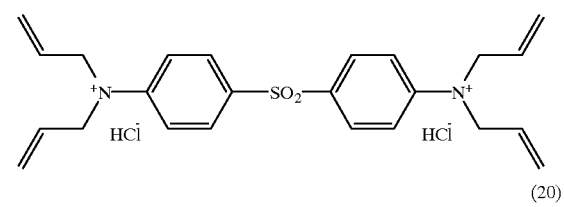

(19)

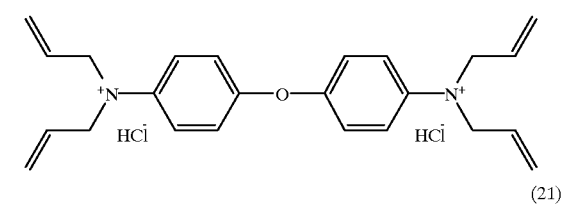

(20)

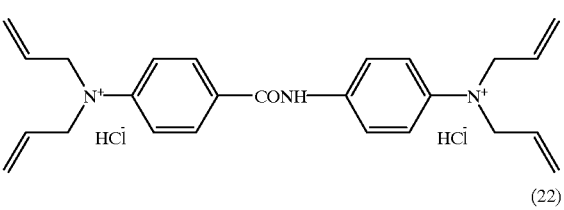

(21)

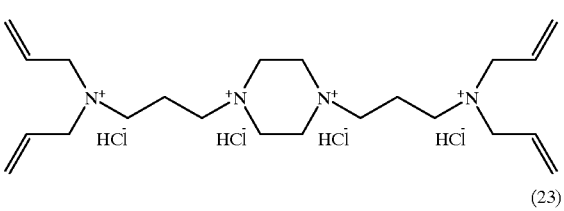

(22)

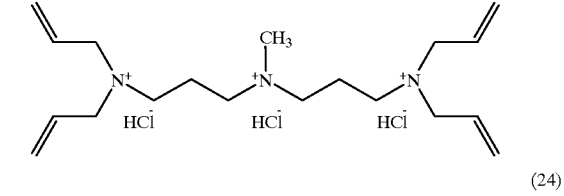

(23)

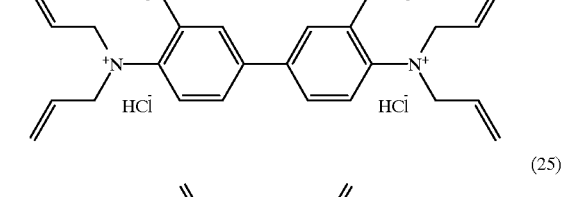

(24)

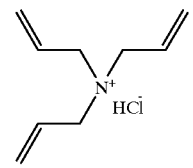

(25)

-continued

(26)
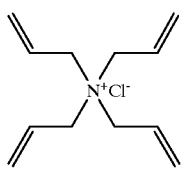

(27)
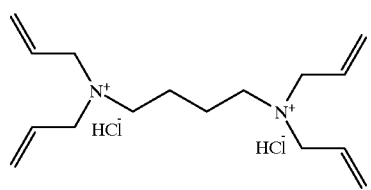

(28)
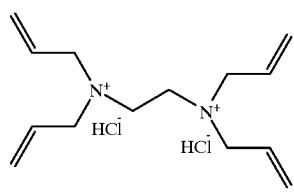

(29)
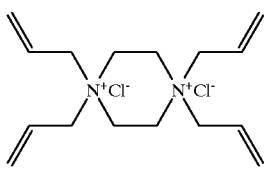

(30)
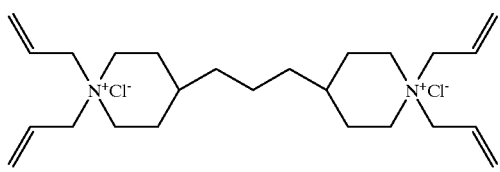

(31)
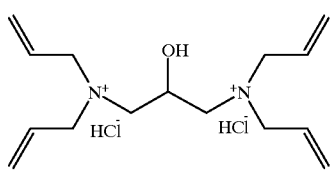

In the production method mentioned above under (2), the copolymerization ratio between the ammonium compound and the compound having two or more diallylammonium groups in each molecule is not particularly restricted but is preferably (40 to 99.9)/(60 to 0.1) by weight, for instance. In the above production methods (A) and (B), another compound other than the compounds mentioned above may be also be subjected to polymerization where appropriate. The concentration of the compound(s) in the aqueous solution is not particularly restricted but the concentration of the aqueous solution at the time of charging is preferably 30 to 80% by weight, for instance, from the handling viewpoint. The aqueous solution may further be concentrated by a dehydration procedure before the start of polymerization or during polymerization.

The water-insoluble organic solvent to be used as the medium is not particularly restricted but includes, among others, toluene, xylene, benzene, n-hexane, cyclohexane, octane, mineral oils, mineral spirit, kerosene and brominated or chlorinated hydrocarbons such as 1,1,1-trichloroethane, 1,2-dichloropropane, tetrachloroethane, trichloropropane and tetrachloromethane. These may be used singly or two or more of them may be used in combination. Among them, toluene and xylene are judiciously used from the industrial viewpoint.

When a liquid paraffin and/or a silicone oil is used as the above viscous fluid, the content of the viscous fluid in the medium is preferably 0.1 to 50% by weight based on the total amount of the medium including the viscous fluid. When it is less than 0.1% by weight, the spherical particles formed may not be fully prevented from becoming agglomerate bodies and, when it exceeds 50% by weight, the particle diameter may possibly decrease. A content of 1 to 40% by weight is more preferred and 5 to 30% by weight is still more preferred. The viscosity of the viscous fluid-containing medium may be such that the viscosity after addition of the viscous fluid is higher than that before addition.

The polymerization conditions in the above copolymerization, namely the polymerization temperature, polymerization time, stirring conditions and the polymerization initiator and additives to be used and so forth, are not particularly restricted but may appropriately be selected according to the size, performance characteristics, quality and other properties of the product spherical particles. The polymerization temperature, for instance, is preferably selected within the range of 20 to 150° C., more preferably 50 to 120° C. Azeotropic dehydration may be employed in an ordinary pressure or reduced pressure system. The polymerization time may appropriately be selected according to the other conditions and is preferably 4 to 50 hours. As for the stirring conditions, the stirring rate in ordinary polymerization may be employed. The polymerization initiator to be used may be a water-soluble one or a oil-soluble one and those peroxide or azo initiators in common use can be used. As for the additives, conventional dispersion stabilizers and others can be used. Other polymerization conditions are not particularly restricted.

As a typical example of the method of producing (B) mentioned above, the case of carrying out reversed phase suspension polymerization by adding dropwise an aqueous solution of diallyldimethylammonium chloride and N,N,N', N'-tetraallyldipiperidinylpropanium dichloride and an aqueous solution of a polymerization initiator to a medium prepared by mixing toluene with liquid paraffin and adding a dispersion stabilizer is shown below in terms of a reaction formula. In the following reaction formula, $Y^-$ represents a counter anion chloride ion.

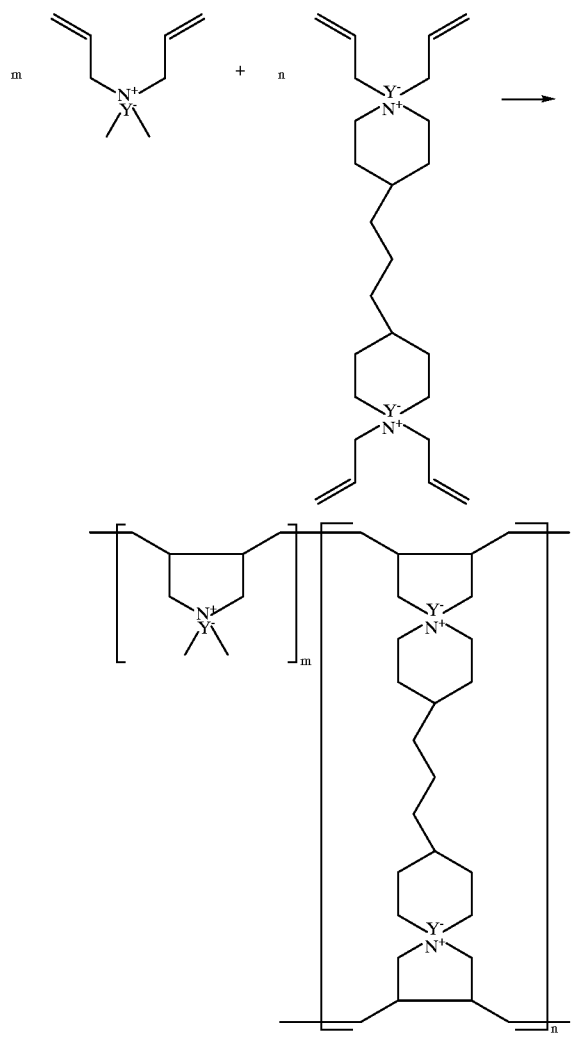

The spherical particles obtained by the above reversed phase suspension polymerization are anion exchange resins with a mean particle diameter of 0.05 to 5 mm, which are industrially useful. These particles are judiciously used in those fields of application in which ion exchange resins are used, for example water treatment, waste water treatment, ions recovery, medicinal fluid purification, catalysts and the like. According to the sixth aspect of the invention, such anion exchange resin particles can be produced as uniform, high-quality spherical particles expediently at low cost and in high yields.

The method of using crosslinked polymers according to the seventh aspect of the invention is now explained.

The crosslinked polymer according to the first or second aspect of the invention can judiciously be used, for example, as an ion exchanging substance (ion exchanger) in ion exchange reactions or as an activating catalyst in reactions activating active hydrogen atoms in active hydrogen-containing compounds. Thus, the seventh aspect of the invention is directed to the method of using the crosslinked polymer according to the first or second aspect of the invention in a reaction step, in which method said reaction step is a step of carrying out an ion exchange reaction or a step of carrying out a reaction activating an active hydrogen in an active hydrogen-containing compound.

An embodiment of carrying out the above reaction process is not particularly restricted and may be selected according to the reaction to be carried out. The above crosslinked polymer as a catalyst to be used in the seventh aspect of the invention can be formed in various shapes and sizes by the known methods. For significantly effecting a function as a catalyst, the polymer is preferably a particle having the size of 100 μm to 10 mm, and if necessary may be used in the shape of agglomerate, powder or membrane.

Further, the reaction in which said crosslinked polymer is used can be carried out using a stirrer batch reactor or a fixed or fluidized bed reactor, and as the reaction type, any of batch type and continuous type can be adopted. Furthermore, said reactor can be used in both said catalytic reaction and the distillation capable of efficiently purifying the products obtainable by said reaction, thus the way of using those is not limited by any process.

In the method of using the crosslinked polymer according to the first or second aspect of the invention, the thermal decomposition temperature thereof can be raised to 300° C. or above according to the structure of the crosslinking sites in said crosslinked polymer, so that the tertiary amine structure, quaternary ammonium salt structure and like structures which the crosslinked polymer has can be prevented from elimination (thermal decomposition). Therefore, the crosslinked polymer can favorably be used under wide temperature conditions for a long period of time, hence the range of application thereof can be markedly broadened. In particular, when the crosslinked polymer is used as an activation catalyst (active hydrogen activating catalyst) for activating active hydrogen in active hydrogen-containing compounds, it is necessary for the crosslinked polymer to be resistant to elevated reaction temperatures. Since said crosslinked polymer mentioned above is excellent in resistance to thermal decomposition, it exhibits good catalytic activity over a long period of time. Since the above crosslinked polymer has a crosslinked structure, there is no possibility of its being eluted into reaction mixtures in ion exchange reactions or reactions for activating active hydrogens.

The above ion exchange substance (ion exchanger) can be used in various forms such as ion exchange resins, ion exchange membranes and the like. In the seventh aspect of the invention, the ion exchange reaction more specifically indicates an anion exchange reaction. Thus, the tertiary amine or quaternary ammonium salt contained in the above crosslinked polymer functions as an ion exchanging group and a hydroxide ion, a halogen ion or an organic or inorganic acid anion of the ion exchanging group is exchanged for another anion.

In the seventh aspect of the invention, the "activating active hydrogen" means that an active hydrogen atom is activated by the nitrogen atom (derived from a tertiary amine or quaternary ammonium salt or, in some instances, from the above-mentioned quaternary ammonium salt structure) which the crosslinked polymer according to the first or second aspect of the invention has.

Meanwhile, it is generally known that cyclic amines or cyclic quaternary ammonium salts are less susceptible to oxidative decomposition than aliphatic amines. From the viewpoint of thermal decomposition resistance of crosslinked polymers, therefore, a cyclic tertiary amine structure and/or cyclic quaternary ammonium salt structure is more preferred as the tertiary amine structure and/or quaternary ammonium salt structure of the crosslinked polymer. Thus, for example, the quaternary ammonium salt structure of the crosslinked polymer according to the first or second aspect of the invention preferably has a structure represented by the above general formula (4) or (14), more specifically a structural unit represented by the above general formula (12).

The active hydrogen to be activated in accordance with the seventh aspect of the invention means a hydrogen atom to be involved in a desired reaction among all the hydrogen atoms that a compound has. Therefore, while it is not particularly restricted, the active hydrogen is preferably higher in reactivity than hydrogen atoms directly bonded to carbon atoms in a hetero atom-free organic compounds. As such active hydrogen, there may be mentioned, among others, a hydrogen directly bonded to a hetero atom; a hydrogen atom bonded to a carbon atom neighboring a electron-attracting group (α-hydrogen atom); a hydrogen atom constituting a substituted aromatic group; and a hydrogen atom constituting a functional group such as that of an aldehyde or carboxylic acid. As specific examples of the hydrogen directly bonded to a hetero atom, there may be mentioned, among others, hydrogen atoms constituting functional groups such as —$NH_2$, —CONH—, —OH and —SH. As the hydrogen atom bonded to a carbon atom neighboring an electron-attracting group, there may be mentioned the hydrogen atom in a position of α carbonyl group, for instance.

Therefore, the active hydrogen-containing compound in the seventh aspect of the invention indicates a compound having such an active hydrogen as mentioned above. The active hydrogen-containing compound may contain a plurality of active hydrogen atoms. When the active hydrogen-containing compound contains a plurality of active hydrogen atoms, the active hydrogen atoms may be the same or different in species with each other or one another.

In the seventh aspect of the invention, the activation of an active hydrogen-containing compound means that the active hydrogen is abstracted (or rendered more readily dissociable) from the active hydrogen-containing compound or, in other words, the active hydrogen which the active hydrogen-containing compound has is activated. Thus, in the seventh aspect of the invention, the crosslinked polymer having at least one crosslink structure represented by the above general formula (1) or (2) can favorably be used in various reactions which involves activation of an active hydrogen for nucleophilic addition of an active hydrogen-containing compound by abstracting the active hydrogen therefrom or rendering the active hydrogen more readily dissociable.

Various examples of the reaction involving the activation of an active hydrogen-containing compound by means of the crosslinked polymer mentioned above, namely examples of the reaction in which an active hydrogen is activated by means of the crosslinked polymer used as a resin catalyst, are not particularly restricted but the crosslinked polymer can favorably be used, for example, in the reactions listed below.

The reaction in which a hydrogen directly bonded to a hetero atom is involved includes, but is not limited to, the following reaction examples described under (1) to (14), among others.
(1) Addition of a cyclic hetero compound (e.g. ethylene oxide, ethylenimine, ethylene sulfide, etc.) to an amine (primary or secondary amine).
(2) Conversion of an amine (primary or secondary amine) to an amide.
(3) Hydrolysis of an amide.
(4) Addition of a cyclic hetero compound to an amide, e.g. addition of ethylene oxide to pyrrolidone or isocyanuric acid.
(5) Addition of a cyclic hetero compound to a thioamide.
(6) Addition of a cyclic hetero compound to water or an alcohol (primary, secondary or tertiary alcohol), e.g. addition of an oxirane compound, such as ethylene oxide or propylene oxide, to water, methanol, ethanol, propanol or butanol.
(7) Reaction between an alcohol (primary, secondary or tertiary alcohol) and a hydrogen halide, e.g. reaction for synthesizing isopropyl bromide from isopropyl alcohol and concentrated hydrogen bromide.
(8) Ester synthesizing reaction using an alcohol (primary, secondary or tertiary alcohol).
(9) Oxidation of an alcohol (primary, secondary or tertiary alcohol).
(10) Addition of a cyclic hetero compound to a phenol (e.g. phenol, hydroquinone, bisphenol A, bisphenol F, bisphenol S, BHPF (bishydroxyphenylfluorene), dihydroxydiphenylmethane, etc.).
(11) Reaction for synthesizing ethers from a phenol and an alkyl halide (Williamson synthesis), e.g. reaction for synthesizing p-nitrobenzyl-p-tolyl ether from p-cresol and p-nitrobenzyl bromide.
(12) Reaction for synthesizing esters using a phenol, e.g. reaction for synthesizing p-nitrophenyl acetate from p-nitrophenol and acetic anhydride or reaction for synthesizing o-bromophenyl-p-toluenesulfonate from o-bromophenol and p-toluenesulfonyl chloride.
(13) Addition of a cyclic hetero compound to a thiol (primary, secondary or tertiary thiol).
(14) Addition of a cyclic hetero compound to a thiophenol.

The reaction in which a hydrogen atom bonded to a carbon atom neighboring an electron-attracting group is involved includes the following reaction examples described under (1) to (8), among others. The reaction in which a hydrogen atom bonded to a carbon atom neighboring an electron-attracting group is not restricted to those reactions.
(1) Halogenation of a ketone, e.g. reaction for introducing a bromine atom into cyclohexanone.
(2) Aldol condensation, e.g. reaction for synthesizing 3-hydroxybutanal from acetaldehyde or reaction for synthesizing diacetone alcohol from acetone.
(3) Perkin condensation reaction.
(4) Knoevenagel condensation reaction.
(5) Cope reaction.
(6) Wittig reaction and other various nucleophilic addition of carbonyl compounds (ketones).
(7) Claisen condensation and other various nucleophilic acyl substitution reactions of ketones.
(8) Addition to an α, β-unsaturated carbonyl compound (ketone) (Michael addition).

The reaction in which a hydrogen atom constituting a substituted aromatic group is involved includes the following reaction examples described under (1) and (2), among others. The reaction in which a hydrogen atom constituting a substituted aromatic group is involved is not restricted to those reactions.
(1) Reimer-Tiemann reaction.
(2) Friedel-Crafts acylation.

The reaction in which a hydrogen atom constituting the functional group of an aldehyde or carboxylic acid is involved includes the following reaction examples described under (1) to (4), among others. The reaction in which a hydrogen atom constituting the functional group of an aldehyde or carboxylic acid is involved is not restricted to those reactions.
(1) Addition of a cyclic hetero compound (e.g. ethylene oxide, propylene oxide, etc.) to a carboxylic acid (e.g. acrylic acid, methacrylic acid, acetic acid, propionic acid, etc.), e.g. reaction for synthesizing hydroxyethyl (meth) acrylate from (meth)acrylic acid and ethylene oxide or for synthesizing hydroxypropyl (meth) acrylate, which is known as a reaction of commercial importance.

(2) Addition of a cyclic hetero compound to a thiocarboxylic acid.

(3) Addition of an alcohol to an aldehyde.

(4) Cannizzaro reaction, more specifically reaction for producing trimethylolpropane by two repetitions of aldol condensation of formaldehyde with n-butylformaldehyde followed by Cannizzaro reaction.

The above crosslinked polymer is more preferably used in the addition reaction of a cyclic hetero compound (preferably an oxirane compound, more preferably ethylene oxide or propylene oxide) or an aldehyde with at least one active hydrogen-containing compound selected from the group consisting of phenols, amides, water, alcohols, carboxylic acids, malonic acid, cyanoacetic acid, and esters thereof; Mannich reaction; alkylation of aromatic compounds; hydroxyalkyl esterification of (meth) acrylic acid as described in Japanese Kokoku Publication Sho-41-13019; cyanohydrin formation reaction; cyanoethylation and the like among the above-mentioned reactions involving the activation of an active hydrogen of an active hydrogen-containing compound. The crosslinked polymer is more preferably used in reactions involving addition of an oxirane compound (particularly an ethylene oxide and propylene oxide) to an active hydrogen-containing compound (particularly suitable are water, alcohols containing 1 to 6 carbon atoms and (meth) acrylic acid) selected from the group consisting of water, alcohols, carboxylic acids and esters thereof, among the reactions mentioned above.

The method of using the crosslinked polymer in accordance with the eighth aspect of the invention is now explained.

The eighth aspect of the invention is directed to a method of producing a hydroxy alkyl (meth) acrylate by the reaction of a (meth)acrylic acid with an oxirane compound, in which the crosslinked polymer of the first or second aspect of the invention is used as a catalyst. Here, the term "(meth) acrylate" represents acrylate or methacrylate, while the term "(meth)acrylic acid" represents acrylic acid or methacrylic acid. The oxirane compounds to be used in the synthesis reaction are alkylene oxides preferably containing 2 to 6 carbon atoms, more preferably 2 to 4 carbon atoms. Typical examples of the compounds include ethylene oxide, propylene oxide, butylene oxide. Alkylene oxides are used in the amount of not less than the equivalent moles, preferably 1.0 to 5.0 moles relative to one mole of (meth)acrylic acids. The reaction is carried out at the temperature of generally 50 to 130° C., preferably 50 to 100° C. At the temperature of lower than 50° C., the reaction velocity is too low to practically use. At the high temperatures over 130° C., the polymerization of the reaction materials or products is likely to proceed and therefor it is not preferred.

This synthesis reaction is generally carried out in the liquid state under the pressurerized atmosphere, preferably under the pressure sufficient to maintain the liquid state of the reaction mixture. The atmosphere condition at the reaction is not particularly restricted, but the reaction is preferably carried out under inert gas such as nitrogen.

In the reaction, polymerization inhibitors are generally used in order to prevent (meth)acylic acid or its ester from polymerization, however the type of the inhibitors are not particularly restricted and the polymerization inhibitors to be used in the same kind of the reaction may be appropriately selected. Typical examples thereof include hydroquinone, hydroquinone momethyl ether, phenothiazine, copper dibutyldithiocarbamate and the like. Said polymerization inhibitors are used in the amount of generally not less than 0.001% by weight, preferably not less than 0.01% by weight and not more than 1% by weight, and still more preferably not more than 0.5% by weight relative to (meth)acrylic acid. Furthermore, this reaction may be carried out in the presence of the solvent. As the solvent, inert solvents such as benzene, toluene, xylene, hexane, heptane and petrol ether may appropriately be selected.

In the invention, by using the crosslinked polymer having at least one crosslink structure of the general formula (1) or (2) as a catalyst in the above reaction system, its effects to a satisfactory extent and thus enables the production of hydroxy alkyl (meth)acrylate in high yield, which is an useful industrial chemical. An embodiment of carrying out the production of the eighth aspect of the invention is the same as the description of the seventh aspect of the invention.

Particularly suited as the above hydroxy alkyl (meth) acrylates are, for example hydroxyethyl acrylate (HEA), hydroxyethyl methacrylate (HEMA), hydroxypropyl acrylate (HPA) and hydroxypropyl methacrylate (HPMA).

The hydroxy alkyl (meth) acrylates produced by the method of using the crosslinked polymer in accordance with the eighth aspect of the invention constitute a preferred embodiment of the present invention.

The method of using the crosslinked polymer in accordance with the ninth aspect of the invention is now described.

The ninth aspect of the invention is directed to a method of producing glycols by the reaction of water with an oxirane compound, in which the crosslinked polymer according to the first or second aspect of the invention is used as a catalyst. In such method of using the crosslinked polymer, the crosslinked polymer according to the first or second aspect of the invention serves as a catalyst for synthesis and produces its effects to a satisfactory extent and thus enables the production of glycols, which are useful industrial chemicals.

An embodiment of carrying out the production of the ninth aspect of the invention is the same as the description of the seventh and tenth aspects of the invention.

Most suited as the glycol is ethylene glycol, among others.

The glycols produced by the method of using the crosslinked polymer in accordance with the ninth aspect of the invention constitute a preferred embodiment of the present invention.

The method of producing glycols according to the tenth aspect of the invention, by which the crosslinked polymer according to the first or second aspect of the invention can adequately be used, is now explained.

The method of producing glycols in accordance with the tenth aspect of the invention is a method of producing glycols which comprises reacting an oxirane compound with water in the presence of a crosslinked polymer.

The above oxirane compound is not particularly restricted but may be any epoxy group-containing compound. Thus it includes, among others, aliphatic alkylene oxides such as ethylene oxide, propylene oxide, isobutylene oxide, 1,2-butylene oxide, 2,3-butylene oxide and pentylene oxide; aromatic alkylene oxides such as styrene oxide; cyclohexene oxide and the like. These may be used singly or two or more of them may be used in combination. Among them, aliphatic alkylene oxides containing 2 or 3 carbon atoms, namely ethylene oxide and propylene oxide, are preferred. Ethylene oxide is more preferred. Therefore, the method of producing glycols in accordance with the tenth aspect of the invention is most suitably applied to the production of ethylene glycol by reacting ethylene oxide with water.

In the tenth aspect of the invention, the ratio between the raw materials oxirane compound and water is not particularly restricted but the water/oxirane compound mole ratio is preferably 1/1 to 20/1, for instance. When it is intended to produce a monoglycol with good selectivity, a water-to-oxirane compound mole ratio less than 1 may allow the formation, in increased amounts, of such byproducts as diglycol and triglycol, and thus decrease the selectivity toward the monoglycol. When the water-to-oxirane compound mole ratio is higher than 20, a process becomes necessary for removing the water used in excess for the reaction by using a lot of energy in a purification step following the recovery of the product, hence no utility reducing effect can be expected and the method may become unfavorable from the process viewpoint. From the process viewpoint, the ratio is more preferably 1/1 to 10/1, still more preferably 1/1 to 7/1 and, for attaining a high level selectivity toward monoglycol, it is more preferably 5/1 to 20/1, still more preferably 7/1 to 20/1.

The crosslinked polymer to be used in the glycol production method according to the tenth aspect of the invention comprises an organic high-molecular compound which has a hetero atom as an essential member in the main chain and/or crosslink structure, said organic high-molecular compound not having a hydrogen directly bonded to a hetero atom. Such organic high-molecular compounds may be used singly or two or more may be used in combination.

The crosslinked polymer according to the first or second aspect of the invention can judiciously be applied as the organic high-molecular compound.

The organic high-molecular compound has a main chain as an essential constituent thereof and preferably has a main chain and a crosslink structure as essential constituents thereof. When it has a main chain and a crosslink structure as essential constituents thereof, the organic high-molecular compound is referred to also as "organic crosslinked polymer". The organic high-molecular compound has a structure such that one or both of the main chain and crosslink structure has a hetero atom incorporated therein. Thus, that the main chain and/or crosslink structure contains a hetero atom as an essential member means that a hetero atom has been incorporated in the main chain and/or crosslink structure as an essential member but does not mean that a hetero atom-containing group is bonded, like a side chain, to the main chain and/or crosslink structure. By the fact that the organic high-molecular compound has such structure that heat resistance is improved, chemical degradation is prevented and the catalyst hardly eludes into the reaction mixture during the glycol production, unlike the case where active sites are on the side chains.

When the above organic high-molecular compound has a crosslink structure, the crosslink structure is not particularly restricted structurally and the number of occurrences thereof is not particularly restricted, either. Thus, one or more crosslink structures may be present in each molecule of the organic high-molecular compound. When two or more crosslink structures are present in one and the same organic high-molecular compound molecule, the crosslink structures may all be structurally the same or may be different from one another. The structure of the organic high-molecular compound having such a crosslink structure(s) generally becomes a network structure formed by main chains and a crosslink structure(s) and the number of main chains in each molecule of the organic high-molecular compound is not particularly restricted provided that it is two or more.

The crosslink density of the organic high-molecular compound having such a crosslink structure(s) is not particularly restricted but the proportion of the crosslink structure-forming monomer (crosslinking agent) is preferably 0.1 to 80 mole percent relative to the total number of moles of the monomers forming the organic high-molecular compound. When it is less than 0.1 mole percent, the mechanical strength of the crosslinked polymer may possibly lowers and, when it exceeds 80 mole percent, the permeability to the reaction mixture passing through the crosslinked polymer may decrease, hence the catalytic activity may not be produced to the full in the production glycols. It is preferably 0.5 to 50 mole percent, more preferably 1 to 20 mole percent.

Each hetero atom occurring in the main chain and/or crosslink structure of the organic high-molecular compound serves as an active site exhibiting catalytic activity in the reaction for forming glycols from an oxirane compound and water. In this manner, the active sites of the organic high-molecular compound constituting the crosslinked polymer are incorporated in the structure of the main chain and/or crosslink structure and, therefore, the crosslinked polymer hardly undergoes thermal decomposition owing to such chemical structure and the active sites hardly undergo elimination or decomposition during reaction under the influence of heat, among others, as compared with the conventional crosslinked polymers. The crosslinked polymer is thus excellent in heat resistance.

The above hetero atom is not particularly restricted but includes, among others, nitrogen, oxygen, sulfur, phosphorus, aluminum, boron, zinc, copper, nickel and iron atoms. These may be employed singly or two or more of them may be employed in combination. Among them, the main chain and/or crosslink structure preferably contains a nitrogen atom(s), however. These hetero atoms are preferably in the ionized form since the catalytic activity is improved in such form. The cationized form is more preferred. Thus, in the most preferred form of the crosslinked polymer of the invention, the organic high-molecular compound constituting the crosslinked polymer has a cationized nitrogen atom(s) in the main chain and/or crosslink structure or, in other words, the crosslinked polymer has a structure such that a cationized nitrogen atom(s) has(have) been incorporated in the main chain and/or crosslink structure. For improving the catalytic activity by increasing the proportion of active sites, such ammonium salt structure preferably has a structure such that a cationized nitrogen atom(s) has (have) been incorporated in the main chain by two bonds and/or a structure such that a cationized nitrogen atom(s) has (have) been incorporated in each crosslinking site by three or four bonds.

In the tenth aspect of the invention, the organic high-molecular compound constituting the crosslinked polymer preferably has a main chain formed of a quaternary ammonium salt structure-containing repeating unit as a main constituent. In this case, the main chain of the organic high-molecular compound may additionally have or may not have a quaternary ammonium structure-free repeating unit. Such quaternary ammonium salt structure-containing repeating unit preferably comprises a cyclic amine structure, like in the first aspect of the invention. The above quaternary ammonium salt structure is more preferably composed of diallyldimethylammonium salt.

In the tenth aspect of the invention, it is essential that an organic high-molecular compound does not have a hydrogen directly bonded to a hetero atom and the term "organic high-molecular compound" means a high-molecular compound whose skeletal main chain is formed of a hydrocarbon as a main component.

If the above organic high-molecular compound has a hydrogen directly bonded to a hetero atom, the hydrogen, for example, reacts with an oxirane compound and, as a result, the crosslinked polymer swells as the reaction of the oxirane compound with water progresses, with the result that the reaction efficiency decreases and, moreover, repeated use of the crosslinked polymer becomes difficult. As the hydrogen directly bonded to a hetero atom, there may be mentioned, among others, a hydrogen atom bonded to the hetero atom of an —OH, —NH—, —NH$_2$, —SH, —COOH or like group.

The above organic high-molecular compound preferably has a counter anion.

The "counter anion" means an anion coordinating with a cationized hetero atom occurring, for example in the main chain and/or crosslink structure as a cationized site in the organic high-molecular compound. The number of such counter anions in each molecule of the organic high-molecular compound is not particularly restricted.

The above counter anion is not particularly restricted but includes, among others, those anions mentioned hereinbefore. One or more such counter anions may occur in the organic high-molecular compound. Among them, the hydrogen carbonate ion, hydrogen sulfite ion, formate ion and molybdate ion are preferred. More preferred are the hydrogen carbonate ion and formate ion, and most preferred is the hydrogen carbonate ion. In the method of producing glycols in accordance with the tenth aspect of the invention, the hydrogen carbonate ion is preferably employed as an essential counter anion. The catalytic activity is more improved and the selectivity for monoglycols is more improved thereby.

The method of producing the above organic high-molecular compound is not particularly restricted but, for example, when it has a crosslink structure, the main chain formation and crosslink structure formation may be carried out stepwise or simultaneously. For example, the above compound can be produced by polymerizing a monomer composition comprising a main chain-forming monomer and a crosslink structure-forming monomer. Also usable is the method comprising polycondensation, like in the production of phenol resins, or the method comprising crosslinking a diallylamino group-containing linear polymer using a compound having a reactive group(s), i.e. dihalogen, as a crosslinking agent or a like method of crosslinking a linear polymer with a crosslinking agent at active sites in the polymer. The polymerization or polycondensation conditions and crosslinking conditions and other conditions in such production methods are not particularly restricted. In the preparation of the crosslinked polymer in the tenth aspect of the invention, the organic high-molecular compound produced may be washed and dried or subjected to a like procedure, according to need, and/or made into a composition containing another ingredient or other ingredients, or, when it is solid-like, the polymer may be ground or otherwise processed.

The form of the crosslinked polymer in the tenth aspect of the invention is not particularly restricted but a powder-like or solid-like form is preferred since the separation thereof from the reaction mixture after the reaction of the oxirane compound with water becomes easy.

In the method of producing glycols in accordance with the tenth aspect of the invention, the amount of the crosslinked polymer, the method of feeding the polymer to the reaction apparatus, and the method of separating the crosslinked polymer from the reaction mixture after reaction are not particularly restricted but may appropriately be selected according to the mode of carrying out the production method according to the tenth aspect of the invention. The reaction conditions are not particularly restricted, either. The reaction temperature, for example, is preferably 80 to 200° C. At below 80° C., the rate of reaction becomes slow and the yield per unit time may decrease. At above 200° C., the selectivity toward monoglycols may lower. A temperature of 80 to 160° C. is more preferred and 90 to 140° C. is still more preferred. The reaction pressure is preferably 0.1 to 5 MPa, more preferably 0.15 to 3 MPa, still more preferably 0.2 to 2 MPa.

The method of producing glycols in accordance with the tenth aspect of the invention can be carried out also in the presence of carbon dioxide or an inert gas such as nitrogen, argon or helium and, when the counter anion is the hydrogen carbonate ion, hydroxide ion, chloride ion, bromide or iodide ion, it is preferably carried out in the presence of carbon dioxide. When the counter anion is the hydrogen carbonate ion, among others, the reaction is preferably carried out in the substantial presence of carbon dioxide in view of the maintenance of the catalytic activity in the process of production as well as the loss of the anion. The "substantial presence" means that carbon dioxide is not intentionally removed, that carbon dioxide gas is added to the gaseous phase or liquid phase or that a bicarbonate salt or carbonate salt is used. On that occasion, carbon dioxide gas is added to the system, for example, in an amount such that the content of carbon dioxide in the raw material feed other than the catalyst, inclusive of the oxirane compound, water, carbon dioxide and so forth, amounts to not less than 0.1% by weight. The bicarbonate salt or carbonate salt to be added to the system may be in the form of a solid or solution and the concentration of the bicarbonate ion and/or carbonate ion in the aqueous solution, for instance, is preferably 0.01 to 15% by weight, more preferably 0.2 to 5% by weight. As the bicarbonate or carbonate salt, there may be mentioned salts with alkali metals such as potassium and sodium. So long as the effects of the tenth aspect of the invention are produced, the reactants (oxirane compound and water) and/or some other ingredient(s) than reactants (e.g. another catalyst etc.) may be added according to need.

The glycols to be produced in accordance to the tenth aspect of the invention are not particularly restricted but include various glycols. In the tenth aspect of the invention, it is possible to produce monoglycols resulting from the reaction of one molecule of an oxirane compound with one molecule of water while maintaining the selectivity and productivity. When, for example, ethylene oxide is used as the oxirane compound, it is possible to suppress the formation of extra byproducts such as diethylene glycol and triethylene glycol and improve the selectivity toward monoethylene glycol and it is also possible to produce monoethylene glycol with good selectivity even when the amount of water is restricted to thereby increase the concentration of ethylene oxide. The thus-produced monoglycols may be used as such or may be purified or otherwise processed. Since, however, the selectivity toward monoglycols is high, they can be used as such in industrial applications.

Preferred embodiments of the production of the crosslinked polymer to be used in the method of producing glycols in accordance with the tenth aspect of the invention are the same as those preferred embodiments in the method of producing a spherical particle in accordance with the sixth aspect of the invention, for instance. Preferred as the compound having two or more diallylammonium groups in each molecule, which is to be used in that case, are, for example, the compounds represented by the formulas (18), (19), (20), (22), (23), (24), (27), (28), (29) and (30). Still more preferred is N,N,N'N'-tetraallyldipiperidinylpropanium dichloride represented by the formula (30) shown above.

In the glycol production method in accordance with the tenth aspect of the invention, an oxirane compound is reacted with water in the presence of the crosslinked polymer and, since the crosslinked polymer is excellent in heat resistance, the catalytic activity can stably be maintained and uncolored, high-quality glycols can be produced with good productivity. Furthermore, monoglycols can be produced while attaining selectivity and productivity at the same time. The method becomes an appropriate industrial production method since, when the crosslinked polymer is in the form of spherical particles, the separation thereof becomes easy.

The crosslinked polymer in the tenth aspect of the invention is preferably available to the production of glycolethers by reacting an oxirane compound with a hydroxyl group-containing compound in lieu of water.

The raw material hydroxyl group-containing compound is not particularly restricted but includes aliphatic monohydric alcohols such as methanol, ethanol, n-propanol, isopropanol, n-butanol, isobutanol, tert-butanol, n-hexanol, cyclohexanol, n-octanol, n-dodecanol, benzyl alcohol, methyl cellsolve, ethyl cellsolve, etc., aliphatic dihydric alcohols such as ethylene glycol, propylene glycol, xylylene glycol, cyclohexane dimethanol, polyethylene glycol, polypropylene glycol, etc., and phenols such as phenol, methylphenol, hydroquinone, resolcinol, catechol. Particularly preferred are aliphatic monohydric alcohols containing 1 to 6 carbon atoms and phenols.

In the invention, the ratio between the raw materials oxirane compound and hydroxyl group-containing compound is not particularly restricted but the hydroxyl group-containing compound/oxirane compound mole ratio is preferably 1/1 to 20/1, for instance. When it is intended to produce a glycolether with good selectivity, a hydroxyl group-containing compound-to-oxirane compound mole ratio less than 1 may allow the formation, in increased amounts, of such byproducts as diglycolethers and triglycolethers, and thus decrease the selectivity toward the desired glycolether. When the hydroxyl group-containing compound-to-oxirane compound mole ratio is higher than 20, a process becomes necessary for removing the hydroxides used in excess for the reaction by using a lot of energy in a purification step following the recovery of the product, hence no utility reducing effect can be expected and the method may become unfavorable from the process viewpoint. From the process viewpoint, the ratio is more preferably 1/1 to 10/1, still more preferably 2/1 to 7/1 and, most preferably 3/1 to 5/1.

The glycolethers to be produced according to the invention are not particularly restricted but include any kinds of glycolethers. According to the invention, by reacting an oxirane compound with a hydroxyl group-containing compound, glycolethers can be produced with good selectivity and good productivity simultaneously.

The glycolethers to be produced according to the invention may be used as such or after purification or further processes. Since the selectivity toward glycolethers in the production is excellent, they may be utilized for the industrial use as such.

The method of producing glycolethers according to the invention, which comprises reacting an oxirane compound with a hydroxyl group-containing compound in the presence of the crosslinked polymer, can produce uncolored, high-quality glycolethers with good productivity, while attaining high levels of selectivity toward monoglycolethers and productivity simultaneously. In addition, when the crosslinked polymer is used as a catalyst as mentioned above, the catalyst is easy to be removed from the products so that the production is suitable for industrial productions.

The crosslinked polymer of the invention, which has the constitution mentioned above, is suited for use as an ion exchanging substance in ion exchange reactions and as an activating catalyst in reactions in which active hydrogen is activated. Since it is further excellent in resistance to thermal decomposition, it can judiciously be used under broad temperature conditions over a long period of time.

The crosslinking agent of the invention can be used in various fields of application and is suited for use as a raw material for the production of the above crosslinked polymer.

The method of producing a spherical particle according to the invention is suited for use in the production of crosslinked polymers, making it possible to produce uniform, high-quality spherical particles expediently at low cost in high yields. The method is widely applicable in producing various spherical particles, for example such organic spherical particles as ion exchange resins and water-absorbing resins and such inorganic spherical particles as silica gels.

The method of using crosslinked polymers according to the invention is a method effective in producing chemical products of industrial use efficiently and expediently by utilizing the above crosslinked polymers.

The method of producing a hydroxy alkyl (meth)acrylate according to the invention can produce hydroxy alkyl (meth)acrylates usable for industrial products with high yield and good efficiency by utilizing crosslinked polymers.

The method of producing glycols according to the invention can produce uncolored, high-quality glycols with good productivity by utilizing crosslinked polymers, while attaining high levels of selectivity toward monoglycols and productivity simultaneously. Thus, it can produce with advantage glycols which can be used in a wide range of applications, not only as antifreezing fluids and raw materials for polyesters such as polyethylene terephthalate but also as raw materials for various industrial products.

BEST MODES FOR CARRYING OUT THE INVENTION

The following examples illustrate the present invention in more detail. They are, however, not limitative of the scope of the invention. In the examples, "%" means "% by weight", unless otherwise specified.

EXAMPLE 1

First Step

First, a reaction vessel equipped with a thermometer, stirrer and dropping device was charged with a solution of 71.7 g (519 mmol) of potassium carbonate in 75 ml of water. Then, to this aqueous solution of potassium carbonate was added 50.0 g (238 mmol) of 1,3-di (4-piperidyl)propane at room temperature. At that time point, 1,3-di(4-piperidyl) propane (Wako Pure Chemical Industries; first grade) was not dissolved in the above aqueous potassium carbonate solution, hence stirring was difficult. Therefore, 150 ml of DMF (N,N-dimethylformamide) was added to the above aqueous potassium carbonate solution and, further, 40.1 g (524 mmol) of allyl chloride (Wako Pure Chemical Industries; special grade) as an allylating agent was added dropwise over 30 minutes. During the dripping, heat generation was observed and, therefore, the above reaction vessel was immersed in an ice water bath and the temperature of the solution in the reaction vessel was thereby maintained at 20° C. to 25° C. and, thereafter, the reaction was allowed to proceed at the same temperature for 24 hours. Then, this reaction mixture was poured into 1 liter of water and extracted with two 500-ml portions of ethyl acetate. The ethyl acetate layer was then washed with 500 ml of water and 500 ml of an aqueous saturated solution of sodium chloride, and drive over anhydrous magnesium sulfate. Then, the solvent was distilled off and the residue was distilled at 142° C. to 144° C. and under reduced pressure at 53.3 Pa to give 58.7 g of a compound represented by the formula (32):

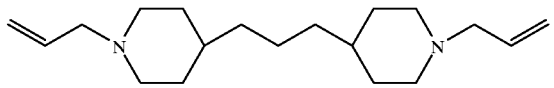

(32)

as the reaction product. The substance was identified by H-NMR and gas chromatography (GC). For GC measurements, a Shimadzu gas chromatograph (trademark: GC-17A gas chromatograph) was used. The column used was a J&W Scientific capillary column (trademark: DB-1; 30 min length, 0.25 mm in diameter). The injection temperature was 250° C. and the column temperature was 200° C. to 300° C. (temperature rise: 10° C./minute) Helium (He) was used as the carrier gas and the rate of flow thereof was 1.0 kg/cm$^2$.

Figure 1:
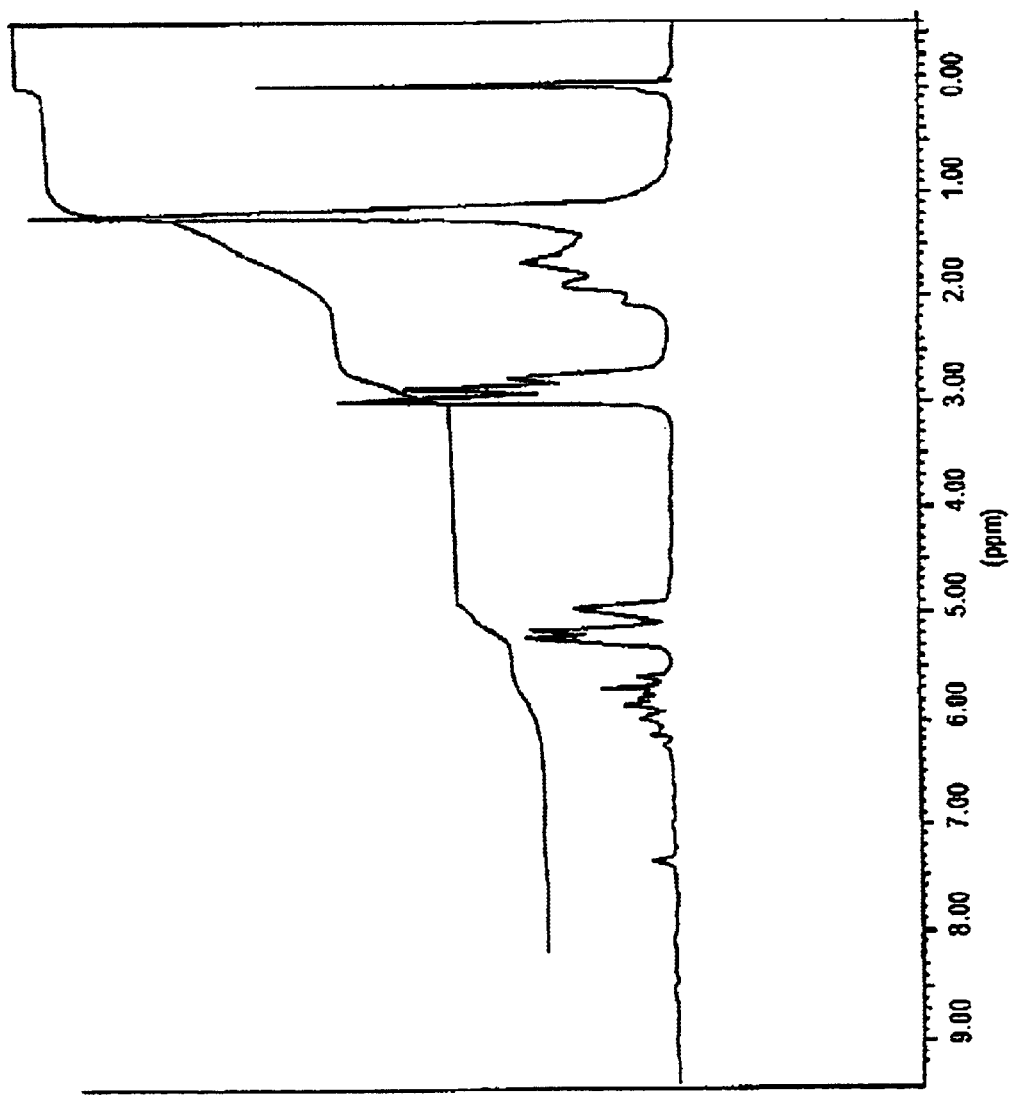
FIG. 1 is a $^1$H-NMR chart of the reaction product obtained in the first step in Example 1 of the present invention.
Figure 2:
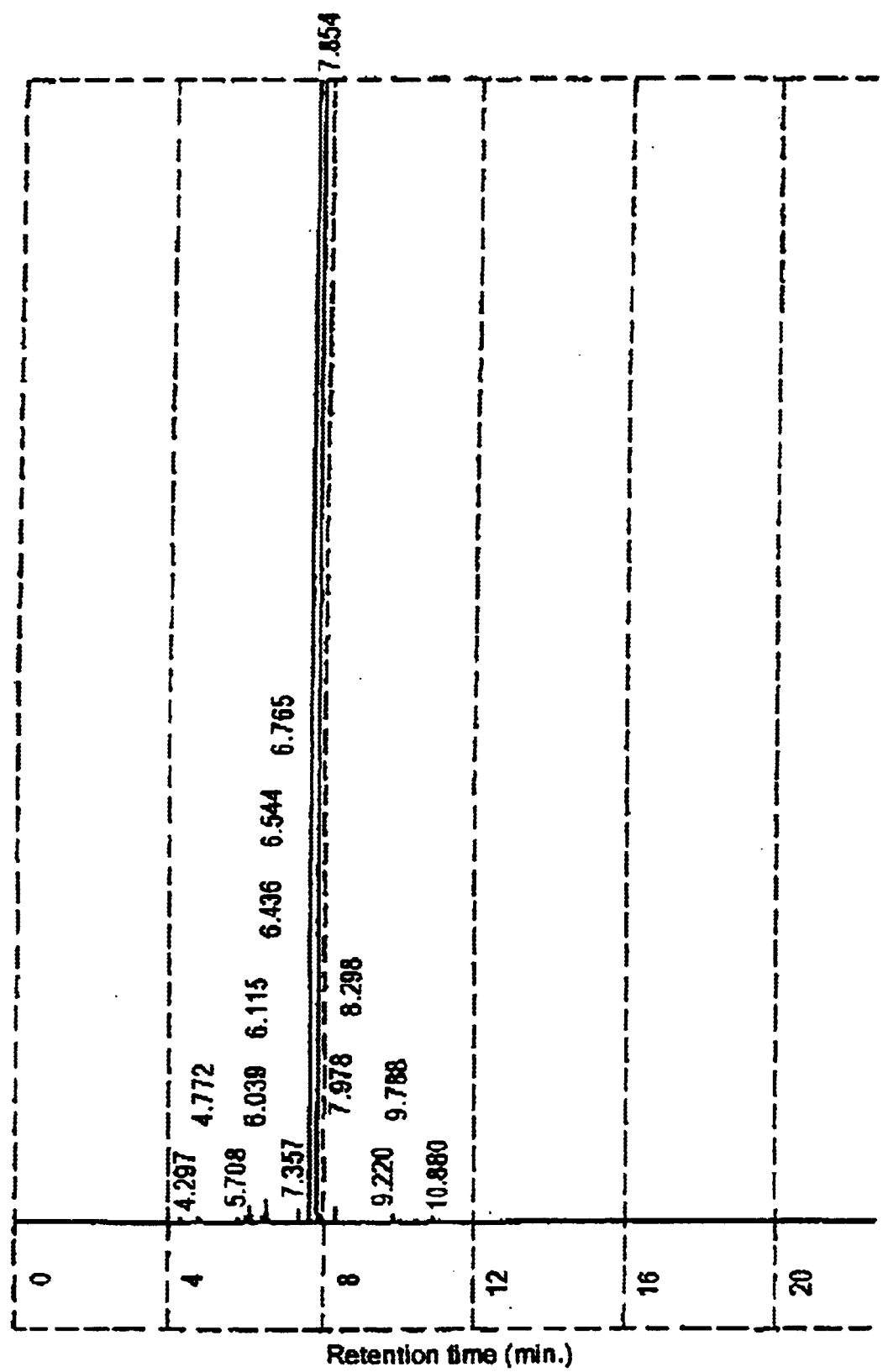
FIG. 2 is a gas chromatogram of the above reaction product.

The $^1$H-NMR chart of the above reaction product is shown in FIG. 1 and the gas chromatogram thereof in FIG. 2. The reaction in the above first step is shown below. The yield of the reaction product, namely the compound represented by the formula (32) given hereinabove was 85%.

Then a one-liter autoclave was charged with 52.3 g (180 mmol) of the reaction product obtained in the above first step, namely the compound represented by the above formula (32), 41.3 g (540 mmol) of allyl chloride as an allylating agent and 400 ml of acetone as a solvent, and the reaction was allowed to proceed at 87° C. for 72 hours.

After completion of the reaction, the reaction mixture was cooled, and the resulting crystals were separated by filtration and washed with 1 liter of acetone. The thus-obtained crystals were then dried under vacuum to give 76.1 g of the reaction product. The thus-obtained reaction product

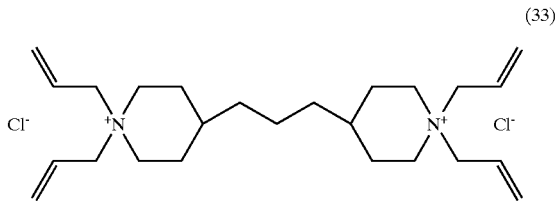

(33)

was identified by $^1$H-NMR spectrometry. As a result, the reaction product was identified as N,N,N',N'-tetraallyldipiperidylpropanium dichloride (TADPPC) represented by the formula (33), namely a novel crosslinking agent according to the present invention.

Figure 3:
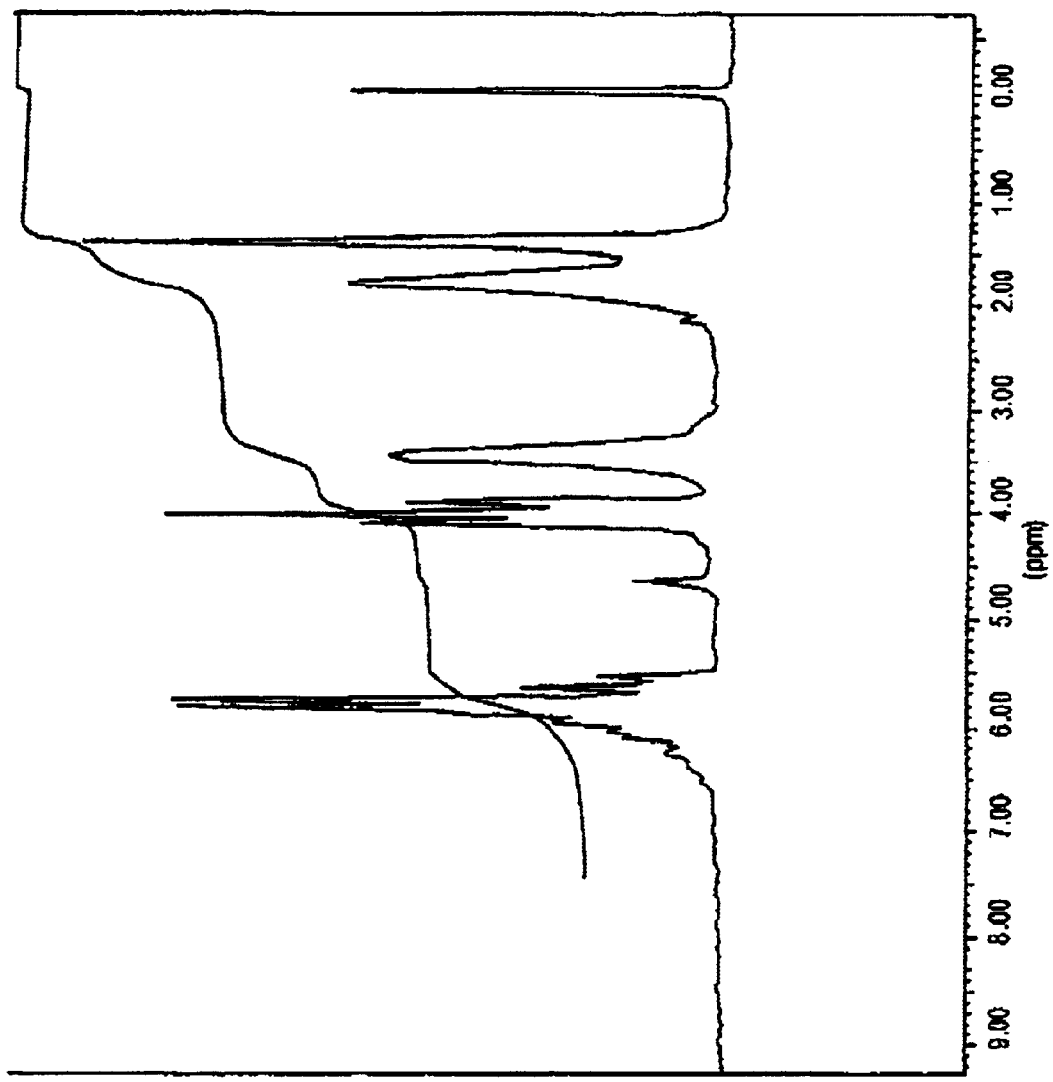
FIG. 3 is a $^1$H-NMR chart of the reaction product obtained in the second step in Example 1 of the present invention.

The $^1$H-NMR chart of the above reaction product is shown in FIG. 3 and the reaction in the above second step is shown below. The yield of the reaction product obtained, namely TADPPC represented by the formula (33) given above was 95%.

EXAMPLE 2

In a glass pressure bottle were mixed together 8.35 g of a 65% aqueous solution of diallyldimethylammonium chloride (DADMAC) (Aldrich), 1.65 g of N,N,N',N'-tetraallyldipiperidylpropanium dichloride (TADPPC), 80 mg of 2,2'-azobis(2-amidinopropane) dihydrochloride (Wako Pure Chemical Industries; trademark: V-50) and 0.6 g of water to attain dissolution (monomer concentration 66.3%, DADMAC/TADPPC=90/10 mol %). The glass pressure bottle was then heated at 55° C. for 4 hours and then at 75° C. for 2 hours to thereby effect the polymerization of the above monomer components.

After completion of the polymerization, the glass pressure bottle was cooled and the polymerization product obtained was recovered. The polymerization reaction product was washed with three 100-ml portions of methyl alcohol and then dried at 60° C. under reduced pressure, whereby a dried form of the resulting crosslinked polymer was obtained in 100% yield as a crosslinked polymer (A) having a crosslink structure represented by the general formula (1) given hereinbefore. Using the above crosslinked polymer as a sample, the thermal decomposition point thereof was measured by the method mentioned hereinabove and found to be 386° C.

EXAMPLE 3

As an addition reaction of a cyclic hetero compound to a carboxylic acid using the crosslinked polymer A obtained in Example 2 as an activation catalyst for activating an active hydrogen, the hydroxypropylation reaction of acrylic acid was carried out.

Specifically, a reaction vessel equipped with a thermometer and a stirrer was charged with acrylic acid (carboxylic acid) and propylene oxide (cyclic hetero compound, oxirane compound) at a propylene oxide-to-acrylic acid mole ratio of 1.2. To the resulting reaction mixture was then added the crosslinked polymer A obtained in Example 2 in an amount of 10% relative to the acrylic acid. Thereafter, the reaction was allowed to proceed at 70° C. for 4 hours while stirring the mixture to thereby effect hydroxypropylation of acrylic acid.

After completion of the reaction, the reaction mixture was filtered and the filtrate recovered was analyzed by gas chromatography. The conversion of acrylic acid was 77.8%, the selectivity toward the adduct (reaction product) resulting from addition of one molecule of propylene oxide to one molecule of acrylic acid was 87.0%, and the selectivity toward the adduct (reaction byproduct) resulting from addition of two molecules of propylene oxide to one molecule of acrylic acid was 8.9%. The conversion of the reaction substrate, namely acrylic acid, and the selectivity toward the reaction product and that toward the reaction byproduct were determined according to the following definitions.

> Conversion (%) of reaction substrate=(number of moles of reaction substrate consumed/number of moles of reaction substrate fed)×100

> Selectivity toward reaction product (or reaction byproduct)=(number of moles of reaction substrate converted to reaction product (or reaction byproduct)/number of moles of reaction substrate consumed)×100

From the above results, it was found that the crosslinked polymer A obtained in Example 2 can function as a catalyst in the hydroxypropylation of acrylic acid, which is an addition reaction of a cyclic hetero compound to a carboxylic acid.

EXAMPLE 4

The crosslinked polymer A obtained in Example 2 was used and examined as to whether it had anion exchange capacity. Specifically, 10 ml of an about 0.01 N aqueous solution of sodium hydroxide (pH=11.83, 24° C.) and 200 mg of the crosslinked polymer A were placed in a beaker, and the mixture was stirred for 30 minutes. As a result, the pH of the aqueous solution in the beaker lowered to 11.46 (23° C.). This was a result of exchange between the chloride ion, namely the anion of the crosslinked polymer A, and the hydroxide ion, namely the anion in the aqueous solution of sodium hydroxide. From the above result, it became evident that the crosslinked polymer A has an anion exchange capacity.

EXAMPLE 5

An aqueous high-molecular compound precursor solution with a pH of 12.5 was prepared by admixing 119.0 g of a 0.3% aqueous solution of sodium hydroxide containing 42% (as solids) of a high-molecular linear copolymer with a diallyldimethylammonium chloride and diallylamine hydrochloride content ratio (mole ratio) of about 70:30 and a molecular weight of about 150,000 with 47.5 g of a 8.2% aqueous solution of sodium hydroxide. In the aqueous high-molecular compound precursor solution, the linear high-molecular copolymer was in a state alkali-neutralized with sodium hydroxide.

Then, a one-liter separable flask equipped with a thermometer, anchor-shaped stirring blade and reflux condenser was charged with 500 ml of toluene as a dispersion medium (inert organic solvent), 1.25 g of sorbitan monopalmitate (Wako Pure Chemical Industries; trade mark of ICI, the alternate of Span 60) as a suspending agent and 1.25 g of ethylcellulose (Wako Pure Chemical Industries; abt 49%, ethoxy 45 cp) as a precipitation inhibitor. Then, while rotating the anchor type stirring blade at 200 revolutions per minute, the above aqueous high-molecular compound precursor solution was mixed and suspended (dispersed) in the dispersion medium gently and the thus-prepared suspension was allowed to stand at 40° C. for 1 hour. Then, 4.52 g of epichlorohydrin (Wako Pure Chemical Industries; Special grade) as a crosslinking agent was added dropwise to this suspension over 1 hour and then the temperature was raised to 90° C. and the reaction was allowed to proceed for 4 hours.

The reaction mixture in the reaction vessel was then cooled and the toluene was removed by decantation. The subsequent filtration gave polymer beads. The polymer beads obtained were washed with three 600-ml portions of methanol (polar solvent) and dried at 60° C. overnight under reduced pressure, whereby 46.0 g of a dried high-molecular crosslinked polymer (B) was obtained as a crosslinked tertiary amine.

Then, 5 g of this dried crosslinked polymer B and 31.8 g of methanol were placed in a 100-ml four-necked flask and the crosslinked polymer B was allowed to swell with methanol for 30 minutes. Then, to this swollen crosslinked polymer B was slowly added dropwise 13.6 g of methyl iodide (Wako Pure Chemical Industries; Special grade) as a quaternizing agent and the temperature in the four-necked flask was maintained at 45° C. for 6 hours, to thereby allow the quaternization reaction of the crosslinking site tertiary amine in the crosslinked polymer B to proceed.

After completion of the reaction, the polymer beads were recovered by filtering the reaction mixture in the four-necked flask, and the polymer beads were washed with three 100-ml portions of methanol and then dried at 60° C. overnight under reduced pressure to give 7.5 g of a crosslinked polymer resulting from quaternization of the crosslinked copolymer B as a crosslinked polymer C according to the present invention having a crosslink structure represented by the general formula (2) given hereinabove. Based on the C/N ratio found by elemental analysis, the methylation of the tertiary amine was confirmed. The crosslinked polymer C was used as a sample and measured for thermal decomposition temperature by the method mentioned above and found to be 312° C.

EXAMPLE 6

Acrylic acid was hydroxypropylated in the same manner as in Example 3 using the crosslinked polymer C obtained in Example 5 as an activating catalyst. As a result, the conversion of acrylic acid was 61.6%, the selectivity toward the adduct (reaction product) resulting from addition of one molecule of propylene oxide to one molecule of acrylic acid was 82.4% and the selectivity toward the adduct (reaction byproduct) resulting from addition of two molecules of propylene oxide to one molecule of acrylic acid was 14.7%.

From the above results, it was revealed that the crosslinked polymer C obtained in Example 5 can function as a catalyst in the addition reaction of a cyclic hetero compound to a carboxylic acid, namely the hydroxypropylation of acrylic acid.

EXAMPLE 7

The crosslinked polymer C obtained in Example 5 was used and measured for its anion exchange capacity. The anion exchange capacity was measured by the conventional method of ion exchange capacity measurement. As a result of the measurement, the anion exchange capacity of the crosslinked polymer C was found to be about 0.68 meq/ml= (based on Cl-form water-swollen volume). From the above results, it was found that the crosslinked polymer C has anion exchange capacity.

EXAMPLE 8

A crosslinked polymer D of the invention having a crosslink structure represented by the general formula (1) given above was synthesized by carrying out the same reaction and treatment procedures as in Example 2 except that the 65% aqueous solution of diallyldimethylammonium chloride (DADMAC) was used in an amount of 9.15 g in lieu of 8.35 g and the N,N,N',N'-tetraallyldipiperidylpropanium dichloride (TADPPC) was used in an amount of 0.85 g in lieu of 1.65 g and that deionized water was used in an amount of 2.36 g in lieu of 0.6 g (monomer concentration 54.6%; DADMAC/TADPPC=95/5 mol %).

The thus-obtained crosslinked polymer D was washed with three 300-g portions of 3% aqueous sodium hydrogen carbonate and then with three 300-g portions of deionized water, whereby a crosslinked polymer E resulting from substitution of the hydrogen carbonate ion for the counter anion chloride ion was obtained.

EXAMPLE 9

Using the crosslinked polymer E obtained in Example 8 as a catalyst for activating an active hydrogen-containing compound, hydration of ethylene oxide, which is an addition reaction of a cyclic hetero compound to water, was carried out.

Specifically, an autoclave equipped with a thermometer, gas feeding pipe, stirrer and so on was charged with 20 g of deionized water (active hydrogen-containing compound) and 2.6 ml of the crosslinked polymer E in water-swollen state. Then, the autoclave was tightly closed and pressurized with nitrogen, and the inside temperature was raised to 120° C. Then, while stirring the contents, 4.9 g of ethylene oxide (cyclic hetero compound) was introduced via the gas feeding pipe. Thereafter, the reaction mixture was matured with stirring at 120° C. for further 2 hours to thereby effect the hydration of ethylene oxide.

After completion of the reaction, the autoclave was cooled, the reaction mixture was filtered, and the filtrate was analyzed by GC. The conversion of ethylene oxide was 99.9% and the selectivity toward ethylene glycol was 94.2%.

From the above results, it was found that the crosslinked polymer E obtained in Example 8 can function as a catalyst in the hydration of ethylene oxide, which is an addition reaction of a cyclic hetero compound to water.

EXAMPLE 10

A one-liter separable flask equipped with an anchor-shaped stirring blade, reflux condenser, thermometer, nitrogen inlet tube and dropping funnel was charged with 350 mL of toluene and 50 mL of liquid paraffin (Wako Pure Chemical Industries; Special grade) (12.5% in medium), and 0.071 g of sorbitan monopalmitate and 0.213 g of ethylecellulose were added thereto as dispersion stabilizers and dissolved therein. On that occasion, the dissolved oxygen was purged by blowing nitrogen gas into the flask.

Separately, 41.80 g of a 65% aqueous solution of diallyldimethylammonium chloride (DADMAC), 8.26 g of N,N,N',N'-tetraallyldipiperidylpropanium dichloride (TADPPC) and 5.36 g of water mixed up and dissolution was effected and, further, a solution prepared by mixing 0.319 g of the polymerization initiator "V-50" with 3.52 g of water was added (monomer concentration 59.8%; DADMAC/TADPPC=90/10 mol %).

This mixed solution was added dropwise to the reaction vessel at room temperature with stirring at 220 rpm over 30 minutes. Thereafter, the reaction was allowed to proceed at 55° C. for 4 hours, then at 60° C. for 16 hours and further at 92–95° C. for 6 hours. During the above process, after the lapse of 2 hours, the rate of stirring was raised from 220 rpm to 250 rpm and 50 mL (22.2% in medium) of liquid paraffin was added dropwise. Further, while the temperature rose from 55° C. to 60° C., 50 mL of toluene was added (liquid paraffin concentration in medium 20.0%).

After the lapse of the predetermined reaction time, the mixture was cooled and the resulting particles were filtered off. The particles thus separated were washed with 600 mL of toluene and three 800-mL portions of methanol, and dried overnight at 60° C. to give 36.23 g of dried particles. The dried particles obtained were independent particle with a diameter of about 0.3 mm. These were referred to as crosslinked polymer F.

EXAMPLE 11

Using the crosslinked polymer F obtained in Example 10 as an activating catalyst for activating an active hydrogen, the hydroxypropylation of acrylic acid was carried out as an addition reaction of a cyclic hetero compound to a carboxylic acid.

Specifically, a reaction vessel equipped with a thermometer and stirrer was charged with acrylic acid (carboxylic acid) and propylene oxide (cyclic hetero compound, oxirane compound) so that the propylene oxide-to-acrylic acid charge mole ratio amounted to 1.24.

Then, to this reaction vessel was added the crosslinked polymer F obtained in Example 10 in an amount of 10% relative to acrylic acid. Thereafter, the reaction was allowed to proceed at 70° C. for 4 hours while stirring the reaction mixture, to thereby effect the hydroxypropylation of acrylic acid.

After completion of the reaction, the reaction mixture was filtered and the filtrate recovered was analyzed by gas chromatography. The conversion of acrylic acid was 71.5%, the selectivity toward the adduct (reaction product; HPA) resulting from addition of one molecule of propylene oxide to one molecule of acrylic acid was 86.7% and the selectivity toward the adduct (reaction byproduct; DPGA) resulting from addition of two molecules of propylene oxide to one molecule of acrylic acid was 10.3%. The conversion of the reaction substrate acrylic acid and the selectivity for the reaction product and that for the reaction byproduct were determined according to the definitions given hereinabove.

From the above results, it was revealed that the crosslinked polymer F obtained in Example 10 is useful as a catalyst in the hydroxypropylation of acrylic acid, which is an addition reaction of a cyclic hetero compound to a carboxylic acid. After the above reaction, the crosslinked polymer F in the reaction mixture was measured for apparent specific gravity. The apparent specific gravity was 0.206 g/mL.

EXAMPLE 12

A one-liter separable flask equipped with a stirrer, reflux condenser, water trap, reduced pressure maintaining apparatus, thermometer, nitrogen gas inlet tube and dropping funnel was charged with 350 ml of toluene and 50 ml (12.5% in medium) of liquid paraffin, and 0.64 g of sorbitan monopalmitate and 0.21 g of ethylcellulose were added as dispersion stabilizers and dissolution thereof was effected at 40° C. On that occasion, the dissolved oxygen was purged by blowing nitrogen gas into the flask.

Separately, in a 100-ml beaker, 41.74 g of a 65% aqueous solution of diallyldimethylammonium chloride (DADMAC), 8.26 g of N,N,N',N'- tetraallyldipiperidylpropanium dichloride (TADPPC) and 20.78 g of water were mixed up for effecting dissolution and, further, a solution composed of 0.32 g of the polymerization initiator 2,2'-azobis(2-amidinopropane) dichloride ("V-50", trademark, Wako Pure Chemical Industries) and 2.4 g of water was added (monomer concentration 48.2%; DADMAC/TADPPC=90/10 mol %).

The resulting solution was added dropwise to the reaction vessel at 30° C. over 30 minutes and, after completion of the dripping, the reaction was allowed to proceed at 55° C. for 4 hours and then, after further raising the temperature, at 75° C. for 3 hours. After the lapse of 2 hours during the above procedure, the rate of stirring was raised from 220 rpm to 250 rpm and 50 ml (22.2% in medium) of liquid paraffin was added dropwise. Further, during the temperature raising from 55° C. to 75° C., 50 ml of toluene (paraffin concentration in medium 20%) was added, and the reaction system pressure was reduced and the polymerization was allowed to proceed while separating the water distilled off.

After the lapse of the predetermined period of time, the mixture was cooled and the resulting particles were separated by filtration under reduced pressure. The particles filtered off were washed with three 800-ml portions of methanol for 30 minutes and dried at 60° C. overnight to give 32.9 g (gel yield 92.8%) of dried particles. The "gel yield" represents a ratio of solid matters which are not dissolved or melted.

The particles obtained were independent particles having a diameter of about 0.2 mm.

EXAMPLE 13

The same conditions as used in Example 12 were used except that 375 ml of toluene, 25 ml (6.25% in medium) of liquid paraffin, 0.21 g of the initiator (V-50) and 1.6 g of water for dissolving the initiator were initially charged (monomer concentration 48.8%; DADMAC/TADPPC=90/10 mol %). After the lapse of 2 hours during the process, a mixture of 25 ml of toluene and 25 ml of liquid paraffin was added dropwise (liquid paraffin concentration in medium 11.1%) and, after the lapse of 4 hours, 50 ml of toluene was added dropwise (liquid paraffin concentration in medium 10%).

Thereafter, the same procedure was followed to give 29.5 g (gel yield 83.3%) of dried particles. The dried particles obtained were independent particles having a diameter of about 0.3 mm.

EXAMPLE 14

Dried particles (31.8 g, gel yield 97.2%) were obtained by proceeding in the same manner as in Example 12 except that 0.60 g of sorbitan monopalmitate, 0.20 g of ethylcellulose, 48.09 g of the 65% aqueous solution of diallyldimethylammonium chloride (DADMAC), 1.91 g of N,N,N',N'-tetraallylpiperazinium dichloride (TAPC), 0.20 g of the initiator (V-50) and 1.5 g of water were used (monomer concentration 64.2%; DADMAC/TAPC=97/3 mol %). The dried particles obtained were independent particles having a diameter of about 0.2 mm.

EXAMPLE 15

A one-liter separable flask equipped with a stirrer, reflux condenser, thermometer, nitrogen gas inlet tube and dropping funnel was charged with 350 ml of toluene and 50 ml (12.5% in medium) of liquid paraffin, and 0.60 g of sorbitan monopalmitate and 0.20 g of ethylcellulose were added thereto as dispersion stabilizers and dissolved therein at 40° C. On that occasion, the dissolved oxygen was purged by blowing nitrogen gas into the flask.

Separately, in a 100-ml beaker, 40.32 g of a 65% aqueous solution of diallyldimethylammonium chloride (DADMAC) and 9.68 g of a 72.7% aqueous solution of triallylamine hydrochloride (TAAHC) were mixed up and, further, a solution composed of 0.40 g of the initiator (V-50) and 3.0 g of water was added (monomer concentration 62.3%; DADMAC/TAAHC=80/20 mol %).

This solution was added dropwise to the reaction vessel at 30° C. over 30 minutes and, after completion of the dripping, the reaction was allowed to proceed at 55° C. for 4 hours and then, after further raising the temperature, at 75° C. for 2 hours. During the above process; after the lapse of 2 hours, the rate of stirring was increased from 220 rpm to 250 rpm and 50 ml of liquid paraffin was further added dropwise (liquid paraffin concentration in medium 22.2%). Further, during the temperature raising from 55° C. to 75° C., 50 ml of toluene was added (liquid paraffin concentration in medium 20%).

After the lapse of the predetermined period, the mixture was cooled and the resulting particles were filtered off under reduced pressure. The particles separated were washed with three 800-ml portions of methanol for 30 minutes and dried at 60° C. overnight under reduced pressure to give 22.1 g (gel yield 66.4%) of dried particles.

The dried particles obtained were independent particles having a diameter of about 0.5 mm.

Comparative Example 1

The reaction of Example 15 was attempted in the same manner except that toluene was used in lieu of liquid paraffin so that the whole amount of the medium was accounted for by toluene. However, during the reaction procedure, bulky agglomerates formed and the stirring was thereby rendered difficult. The reaction procedure was discontinued accordingly.

Catalyst Preparation Method 1

A one-liter separable flask equipped with a stirrer, reflux condenser, thermometer, nitrogen gas inlet tube and dropping funnel was charged with 350 mL of toluene and 50 mL (12.5% in medium) of liquid paraffin, 0.6 g of sorbitan monopalmitate and 0.2 g of ethylcellulose were added thereto as dispersion stabilizers and dissolved therein at 40° C. On that occasion, the dissolved oxygen was purged by blowing nitrogen gas into the flask.

Separately, in a 100-mL beaker, 33.61 g of a 65% aqueous solution of diallyldimethylammonium chloride (DADMAC), 3.15 g of N,N,N',N'-tetraallyldipiperidylpropanium dichloride (TADPPC) and 13.24 g of water were mixed and dissolution was effected (DADMAC/TADPPC=95/5 mol %) and, further, a solution composed of 0.4 g of the initiator V-50 and 3 g of water was added (monomer concentration 46.8%).

This mixed solution was added dropwise to the reaction vessel at 30° C. over 30 minutes and, thereafter, the reaction was allowed to proceed at 55° C. for 4 hours and then, after further raising the temperature, at 75° C. for 2 hours.

After the lapse of the determined period, the mixture was cooled and the resulting resin was filtered off and separated under reduced pressure. The resin separated was washed three times with 800-mL of methanol for 30 minutes and then dried at 60° C. overnight under reduced pressure to give a dried resin.

The thus-obtained crosslinked product (20.0 g) having the chloride ion as the counter anion was swollen with water and the hydrogen carbonate ion was substituted for the counter anion chloride ion by the column technique using 15 liters of a 3% aqueous solution of sodium hydrogen carbonate. Thereafter, the resin was washed with an equal amount of water to give an organic crosslinked polymer.

EXAMPLE 16

A 5-liter autoclave was charged with 182 mL of the water-swollen crosslinked polymer obtained in Catalyst preparation method 1 (measured using a graduated cylinder and then subjected to filtration treatment under reduced pressure and used in a wet form), 1400 g of water and 350 g of ethylene oxide, and the reaction was allowed to proceed in a nitrogen atmosphere at 120° C. for 2 hours. The amount (1400 g) of the water charged included the water contained in the crosslinked polymer. Analysis of the reaction mixture obtained revealed an ethylene oxide conversion of 99.9% and a selectivity of 94.2 mol % toward monoethylene glycol.

EXAMPLE 17

A 5-liter autoclave was charged with 160 mL of the water-swollen crosslinked polymer obtained in Catalyst preparation method 1 (measured using a graduated cylinder and then subjected to filtration treatment under reduced pressure and used in a wet form) and 1230 g of water, and 527 g of ethylene oxide was continuously fed thereto at 120° C. in a nitrogen atmosphere over 2 hours to thereby effect the reaction. The amount (1230 g) of the total charged included the water contained in the crosslinked polymer. Analysis of the reaction mixture obtained revealed a selectivity of 89.8 mol % toward monoethylene glycol.

EXAMPLE 18

A 5-liter autoclave was charged with 160 mL of the water-swollen crosslinked polymer obtained in Catalyst preparation method 1 (measured using a graduated cylinder and then subjected to filtration treatment under reduced pressure and used in a wet form) and 1230 g of water, and 820 g of ethylene oxide was continuously fed thereto at 120° C. in a nitrogen atmosphere over 2 hours to thereby effect the reaction. The amount (1230 g) of the total charged included the water contained in the crosslinked polymer. Analysis of the reaction mixture obtained revealed a selectivity of 85.5 mol % toward monoethylene glycol.

Catalyst Preparation Method 2

A mixture of 6.45 g of a 65% aqueous solution of diallyldimethylammonium chloride (DADMAC) and 1.29 g of a 72% aqueous solution of N,N,N',N'-tetraallyldiaminobutane dihydrochloride (TeADAB) was placed in a polymerization ampule (DACMAC/TeADAB= 90/10 mol %) and, further, a solution composed of 0.064 g of the polymerization initiator V-50 and 0.32 g of water for dissolving the initiator was added (monomer concentration 63.0%).

This mixture was heated at 55° C. for 4 hours and, after further raising the temperature, the reaction was allowed to proceed at 75° C. for 2 hours.

After the lapse of the predetermined period of time, the mixture was cooled and the resin formed was ground, washed three times in 160 mL of methanol for 30 minutes and then dried at 60° C. overnight under reduced pressure to give a dried resin.

The thus-obtained crosslinked product (2.0 g) was washed with three 200-g portions of a 3% aqueous solution of sodium hydrogen carbonate with stirring and then washed three times with the same amount of water to give a crosslinked polymer resulting from substitution of the hydrogen carbonate ion for the counter anion chloride ion.

EXAMPLE 19

A 100-mL autoclave was charged with 5.2 mL of the water-swollen crosslinked polymer obtained in Catalyst preparation method 2 and 40.0 g of water, and 4.9 g of ethylene oxide was fed thereto at 120° C. in a nitrogen atmosphere and the reaction was allowed to proceed for 1 hour. The amount (40.0 g) of the total charged included the water contained in the crosslinked polymer. Analysis of the reaction mixture obtained revealed an ethylene oxide conversion of 85.1% and a selectivity of 98.1 mol % toward monoethylene glycol.

EXAMPLE 20

A 5-liter autoclave was charged with 182 mL of the water-swollen crosslinked polymer obtained in Catalyst preparation method 1 (measured using a graduated cylinder and then subjected to filtration treatment under reduced pressure and used in a wet form), 1400 g of water and 350 g of ethylene oxide, and carbon dioxide was added ($CO_2$ addition amount was 0.1% relative to the sum of water, EO and $CO_2$ in the autoclave) The reaction was allowed to proceed at 120° C. for 2 hours. Analysis of the reaction mixture obtained revealed an ethylene oxide conversion of 99.9% and a selectivity of 95.0 mol % toward monoethylene glycol.

EXAMPLE 21

A 5-liter autoclave was charged with 182 mL of the water-swollen crosslinked polymer obtained in Catalyst preparation method 1 (measured using a graduated cylinder and then subjected to filtration treatment under reduced pressure and used in a wet form), 1400 g of water and 350 g of ethylene oxide, and carbon dioxide was added ($CO_2$ addition amount was 5% relative to the sum of water, EO and $CO_2$ in the autoclave) The reaction was allowed to proceed at 120° C. for 2 hours. Analysis of the reaction mixture obtained revealed an ethylene oxide conversion of 99.9% and a selectivity of 94.8 mol % toward monoethylene glycol.

EXAMPLE 22

A 5-liter autoclave was charged with 160 mL of the water-swollen crosslinked polymer obtained in Catalyst preparation method 1 (measured using a graduated cylinder and then subjected to filtration treatment under reduced pressure and used in a wet form), and 1230 g of water, and carbon dioxide was added ($CO_2$ addition amount was 0.1% relative to the sum of water, EO (to be charged) and $CO_2$ in the autoclave). While continuously feeding 820 g of ethylene oxide, the reaction was allowed to proceed at 120° C. for 2 hours. Analysis of the reaction mixture obtained revealed a selectivity of 86.2 mol % toward monoethylene glycol.

EXAMPLE 23

A 5-liter autoclave was charged with 160 mL of the water-swollen crosslinked polymer obtained in Catalyst preparation method 1 (measured using a graduated cylinder and then subjected to filtration treatment under reduced pressure and used in a wet form), and 1230 g of water, and carbon dioxide was added (CO$_2$ addition amount was 5% relative to the sum of water, EO (to be charged) and CO$_2$ in the autoclave). While continuously feeding 820 g of ethylene oxide, the reaction was allowed to proceed at 120° C. for 2 hours. Analysis of the reaction mixture obtained revealed a selectivity of 86.0 mol % toward monoethylene glycol.

Catalyst Preparation Method 3

A mixture of 8.34 g of a 65% aqueous solution of diallyldimethylammonium chloride (DADMAC) and 1.65 g of N,N,N',N'-tetraallyldipiperidylpropanium dichloride (TADPPC) dissolved in 4.15 g of water was placed in a polymerization ampule (DADMAC/TADPPC=90/10 mol %) and, further, a solution composed of 0.113 g of the polymerization initiator V-50 and 0.85 g of water for dissolving the initiator was added (monomer concentration 46.8%).

This mixture was heated at 55° C. for 4 hours and, after further raising the temperature, the reaction was allowed to proceed at 75° C. for 2 hours. After the lapse of the predetermined period of time, the mixture was cooled and the resin formed was ground, washed three times in 300 mL of methanol for 30 minutes and then dried at 60° C. overnight under reduced pressure to give a dried resin.

A 5.0-g portion of the thus-obtained crosslinked product was swollen with water, then washed with three 200-g portions of a 5% aqueous solution of sodium hydroxide with stirring and then washed three times with the same amount of water to give a crosslinked polymer resulting from substitution of the hydroxide ion for the counter anion chloride ion. Further, the swelling solvent water was substituted by methanol and the polymer was dried at 60° C. overnight to give a dried resin.

EXAMPLE 24

A 100-ml autoclave was charged with 1.0 g of the dried resin obtained in Catalyst preparation method 3, 30.0 g of n-butanol and 3.57 g of ethylene oxide, and the reaction was allowed to proceed in a nitrogen atmosphere at 100° C. for 1 hour. Analysis of the reaction mixture obtained revealed an ethylene oxide conversion of 64.5% and selectivity values for monoethylene glycol monobutyl ether/diethylene glycol monobutyl ether/triethylene glycol monobutyl ether of 84.7/14.0/1.3 mol %. Furthermore, the catalyst showed no discoloration after the use and the reaction mixture was colorless and transparent.

Catalyst Preparation Method 4

A one-liter separable flask equipped with a stirrer, reflux condenser, thermometer, nitrogen gas inlet tube and dropping funnel was charged with 350 mL of toluene and 50 mL of liquid paraffin, 0.6 g of sorbitan monopalmitate and 0.2 g of ethylcellulose were added thereto as dispersion stabilizers and dissolved therein at 40° C. On that occasion, the dissolved oxygen was purged by blowing nitrogen gas into the flask.

Separately, in a 100-mL beaker, 46.84 g of a 65% aqueous solution of diallyldimethylammonium chloride (DADMAC), 3.16 g of 1,1,4,4-tetraallyldipiperidyl dichloride (TAPC) and 6.01 g of water were mixed and dissolution was effected (DADMAC/TAPC=95/5 mol %) and, further, a solution composed of 0.2 g of the initiator V-50 and 1.5 g of water was added.

This mixed solution was added dropwise to the reaction vessel at 30° C. over 30 minutes and, thereafter, the reaction was allowed to proceed at 55° C. for 4 hours and then, after further raising the temperature, at 75° C. for 3 hours while dehydrogenation was carried out under the reduced pressure.

After the lapse of the determined period, the mixture was cooled and the resulting resin was filtered off and separated under reduced pressure. The resin separated was washed three times with 800-mL of methanol for 30 minutes and then dried at 60° C. overnight under reduced pressure to give a dried resin.

A 15.0-g portion of the thus-obtained crosslinked product was swollen with water, then washed with three 500-g portions of a 5% aqueous solution of sodium hydroxide with stirring and then washed three times with the same amount of water to give a crosslinked polymer resulting from substitution of the hydroxide ion for the counter anion chloride ion. Further, the swelling solvent water was substituted by methanol and the polymer was dried at 60° C. overnight to give a dried resin.

EXAMPLE 25

A 100-ml autoclave was charged with 1.0 g of the dried resin obtained in Catalyst preparation method 4, 30.0 g of ethanol and 5.74 g of ethylene oxide, and the reaction was allowed to proceed in a nitrogen atmosphere at 100° C. for 1 hour. Analysis of the reaction mixture obtained revealed an ethylene oxide conversion of 72.2% and selectivity values for monoethylene glycol monoethyl ether/diethylene glycol monoethyl ether/triethylene glycol monoethyl ether of 80.8/16.3/2.9 mol %. Furthermore, the catalyst showed no discoloration after the use and the reaction mixture was colorless and transparent.

EXAMPLE 26

A 100-ml autoclave was charged with 1.0 g of the dried resin obtained in Catalyst preparation method 4, 30.0 g of monoethylene glycol monoethyl ether and 2.93 g of ethylene oxide (charge molar ratio of 5/1), and the reaction was allowed to proceed in a nitrogen atmosphere at 100° C. for 1 hour. Analysis of the reaction mixture obtained revealed an ethylene oxide conversion of 71.9% and selectivity values for diethylene glycol monoethyl ether/triethylene glycol monoethyl ether/tetraethylene glycol monoethyl ether of 93.5/6.2/0.3 mol %. Furthermore, the catalyst showed no discoloration after the use and the reaction mixture was colorless and transparent.

EXAMPLE 27

The reaction was carried out in the same manner of Example 26 except for 30.0 g of monoethylene glycol monoethyl ether and 4.89 g of ethylene oxide (charge molar ratio of 3/1) were used and the reaction temperature was 140° C. Analysis of the reaction mixture obtained revealed an ethylene oxide conversion of 71.1% and selectivity values for diethylene glycol monoethyl ether/triethylene glycol monoethyl ether/tetraethylene glycol monoethyl ether of 88.4/10.6/1.0 mol %. Furthermore, the catalyst showed no discoloration after the use and the reaction mixture was colorless and transparent.

What is claimed is:

1. A crosslinked polymer having at least one crosslink structure and a tertiary amine structure and/or a quaternary ammonium salt structure, wherein at least one crosslink structure is represented by the following general formula (1):

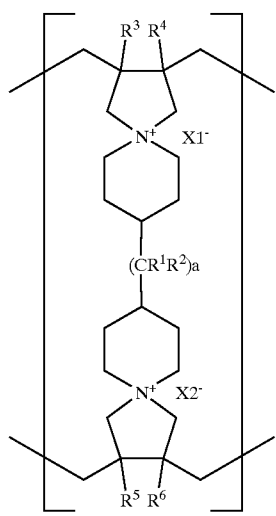

(1)

wherein $R^1$ and $R^2$ are the same or different and each represents a hydrogen or halogen atom or a $C_{1-10}$ alkyl or hydroxyl group; $R^3$, $R^4$, $R^5$ and $R^6$ are the same or different and each represents a hydrogen or halogen atom or a methyl or ethyl group; $X1^-$ and $X2^-$ are the same or different and each represents a halide ion, a hydroxide ion or an organic or inorganic acid anion and a represents an integer of 0 to 10.

2. A method of producing the crosslinked polymer according to claim 1 which comprises the step of suspension polymerization of a monomer composition comprising a monomer represented by the following general formula (4):

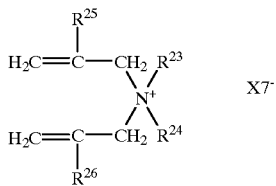

(4)

wherein $R^{23}$ and $R^{24}$ are the same or different and each represents a $C_{1-10}$ alkyl group; $R^{25}$ and $R^{26}$ are the same or different and each represents a hydrogen or halogen atom or a methyl or ethyl group; and $X7^-$ represents a halide ion, a hydroxide ion or an organic or inorganic acid anion, and a crosslinking agent represented by the following general formula (3):

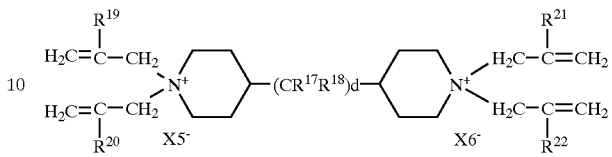

(3)

wherein $R^{17}$ and $R^{18}$ are the same or different and each represents a hydrogen or halogen atom or a $C_{1-10}$ alkyl or hydroxyl group; $R^{19}$, $R^{20}$, $R^{21}$ and $R^{22}$ are the same or different and each represents a hydrogen or halogen atom or a methyl or ethyl group; $X5^-$ and $X6^-$ are the same or different and each represents a halide ion, a hydroxide ion or an organic or inorganic acid anion; and d represents an integer of 0 to 10.

3. The method of claim 2 wherein the crosslinked polymer is in the form of spherical particles and the polymerization is carried out in a medium wherein said medium comprises a viscous fluid.

4. The method of producing a spherical particle according to claim 3,
wherein said viscous fluid comprises a liquid paraffin and/or a silicone oil.

5. A method of using the crosslinked polymer according to claim 1 in a reaction step
wherein said reaction step is a step of carrying out an ion exchange reaction or a step of carrying out a reaction for activating an active hydrogen atom in an active hydrogen-containing compound.

6. A method of producing a hydroxy alkyl (meth) acrylate by the reaction of a (meth) acrylic acid with an oxirane compound,
wherein the crosslinked polymer according to claim 1 is used as a catalyst.

7. A method of producing glycols by the reaction of water with an oxirane compound,
wherein the crosslinked polymer according to claim 1 is used as a catalyst.

* * * * *